(12) United States Patent
Ganigarakoppal Kantharaju et al.

(10) Patent No.: US 12,253,914 B2
(45) Date of Patent: Mar. 18, 2025

(54) RAID DISTRIBUTED PARITY GENERATION SYSTEM

(71) Applicant: Dell Products L.P., Round Rock, TX (US)

(72) Inventors: Nikhith Ganigarakoppal Kantharaju, Hassan (IN); Abhijit Shashikant Mirajkar, Bangalore (IN); Ajay Sukumaran Nair Syamala Bai, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/228,849

(22) Filed: Aug. 1, 2023

(65) Prior Publication Data

US 2025/0045160 A1   Feb. 6, 2025

(51) Int. Cl.
*G06F 11/00* (2006.01)
*G06F 3/06* (2006.01)
*G06F 11/10* (2006.01)

(52) U.S. Cl.
CPC ........ *G06F 11/1076* (2013.01); *G06F 3/0656* (2013.01); *G06F 3/0689* (2013.01)

(58) Field of Classification Search
CPC .................. G06F 11/076; G06F 11/1076
See application file for complete search history.

(56) References Cited

U.S. PATENT DOCUMENTS

| 7,318,190 | B2 | 1/2008 | Edirisooriya |
| 8,429,514 | B1* | 4/2013 | Goel ................... G06F 12/00 714/758 |
| 10,324,782 | B1* | 6/2019 | Dorfman ........... G06F 11/0727 |
| 2011/0208996 | A1* | 8/2011 | Hafner ................ G06F 9/466 714/6.24 |
| 2014/0258612 | A1* | 9/2014 | Kalwitz ............... G06F 3/065 711/114 |
| 2023/0244568 | A1* | 8/2023 | Miller ................ G06F 11/1076 714/6.2 |

* cited by examiner

*Primary Examiner* — Jonathan D Gibson
(74) *Attorney, Agent, or Firm* — Joseph Mencher

(57) ABSTRACT

A RAID distributed parity generation system includes a chassis housing a RAID subsystem coupled to storage devices. The RAID subsystem receives a write instruction including new primary data for a subset of the storage devices that it uses to generate first intermediate parity data that it provides in a parity data storage device. The RAID engine then causes a first primary data storage device that is not in the subset to generate second intermediate parity data using its first primary data and respective second primary data in second primary data storage device(s) that are not in the subset, and provide the second intermediate parity data in the first primary data storage device. The RAID subsystem then causes the parity data storage device to generate final parity data using the first intermediate parity data and the second intermediate parity data.

20 Claims, 41 Drawing Sheets

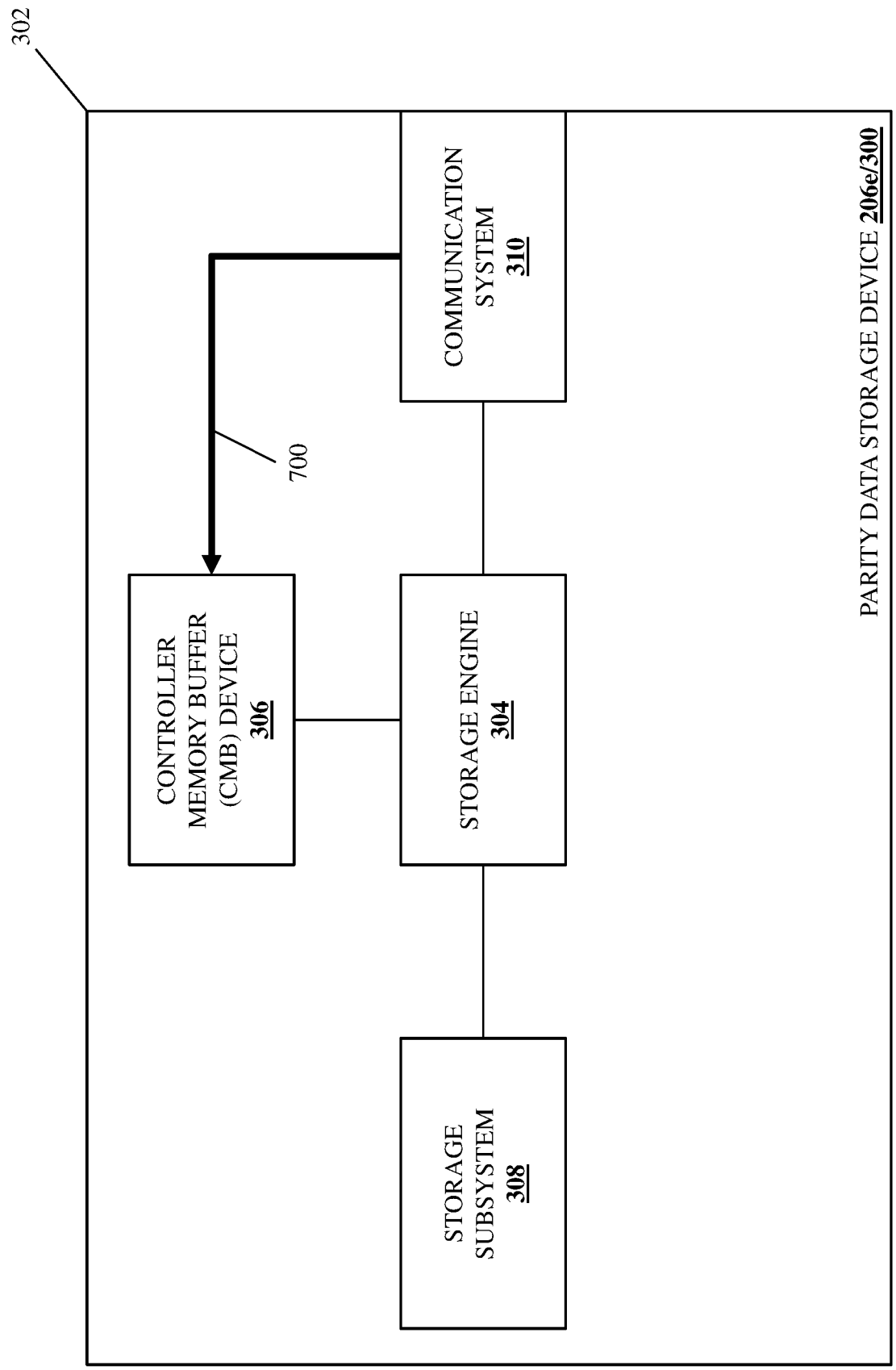

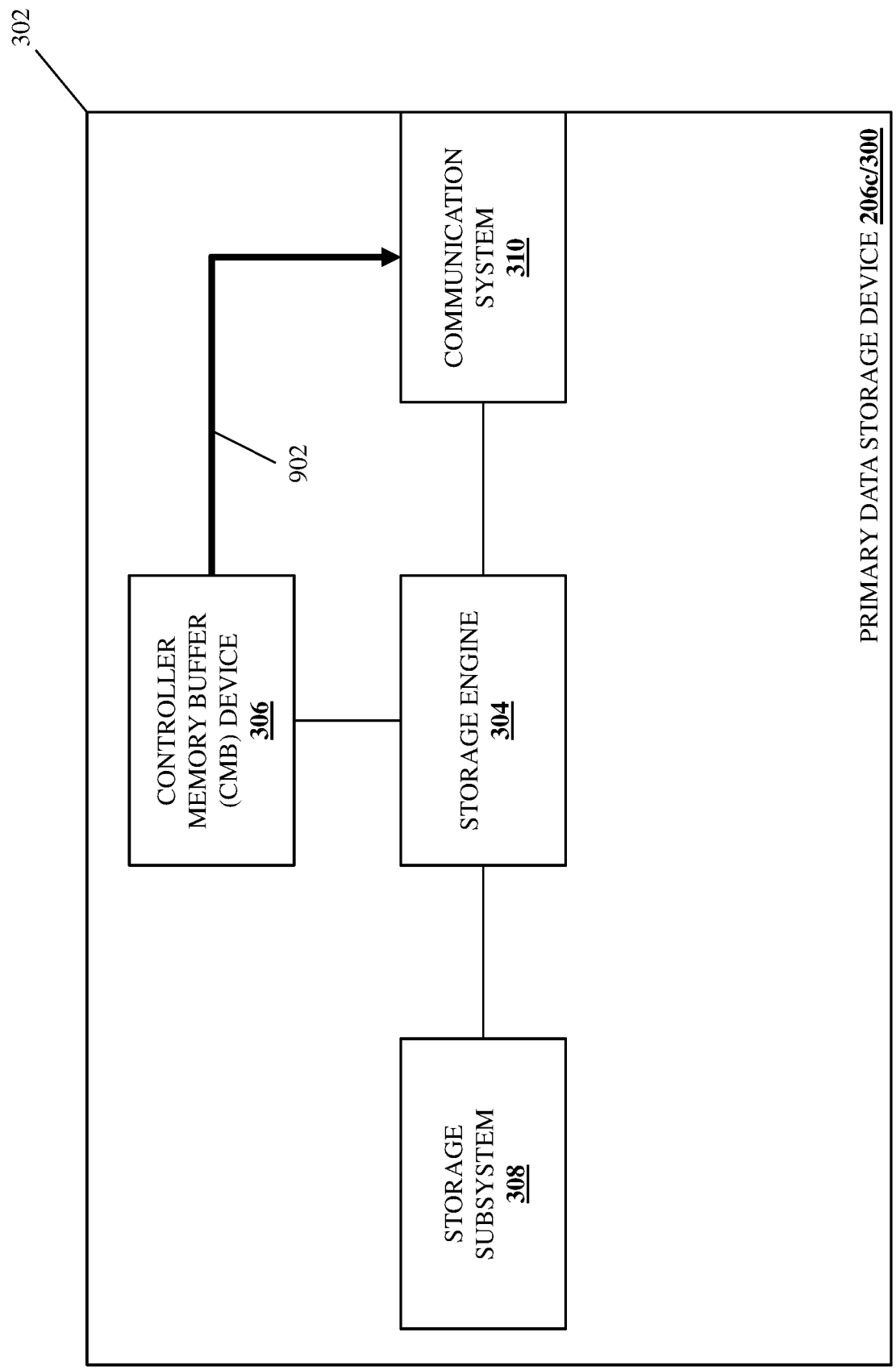

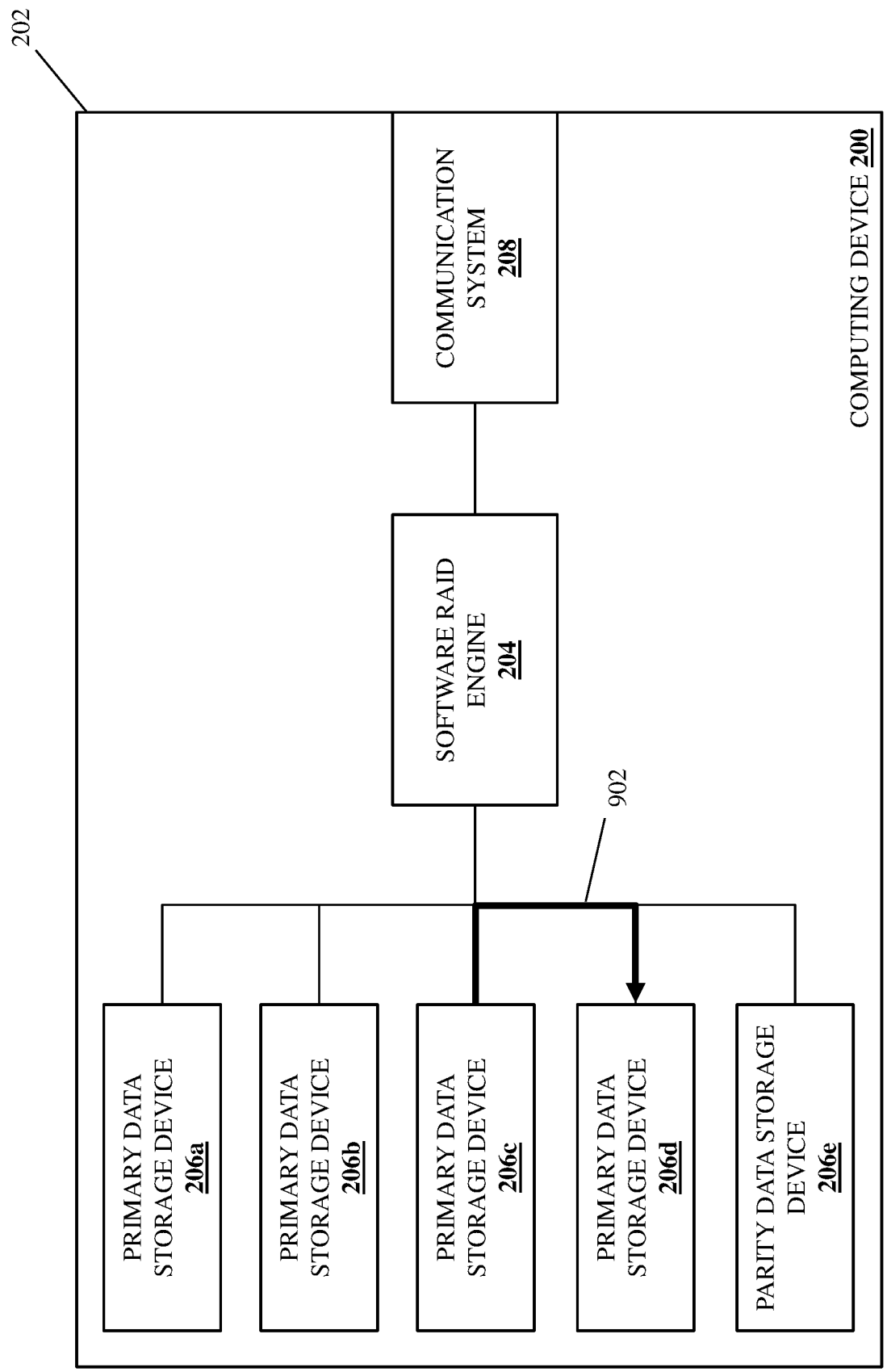

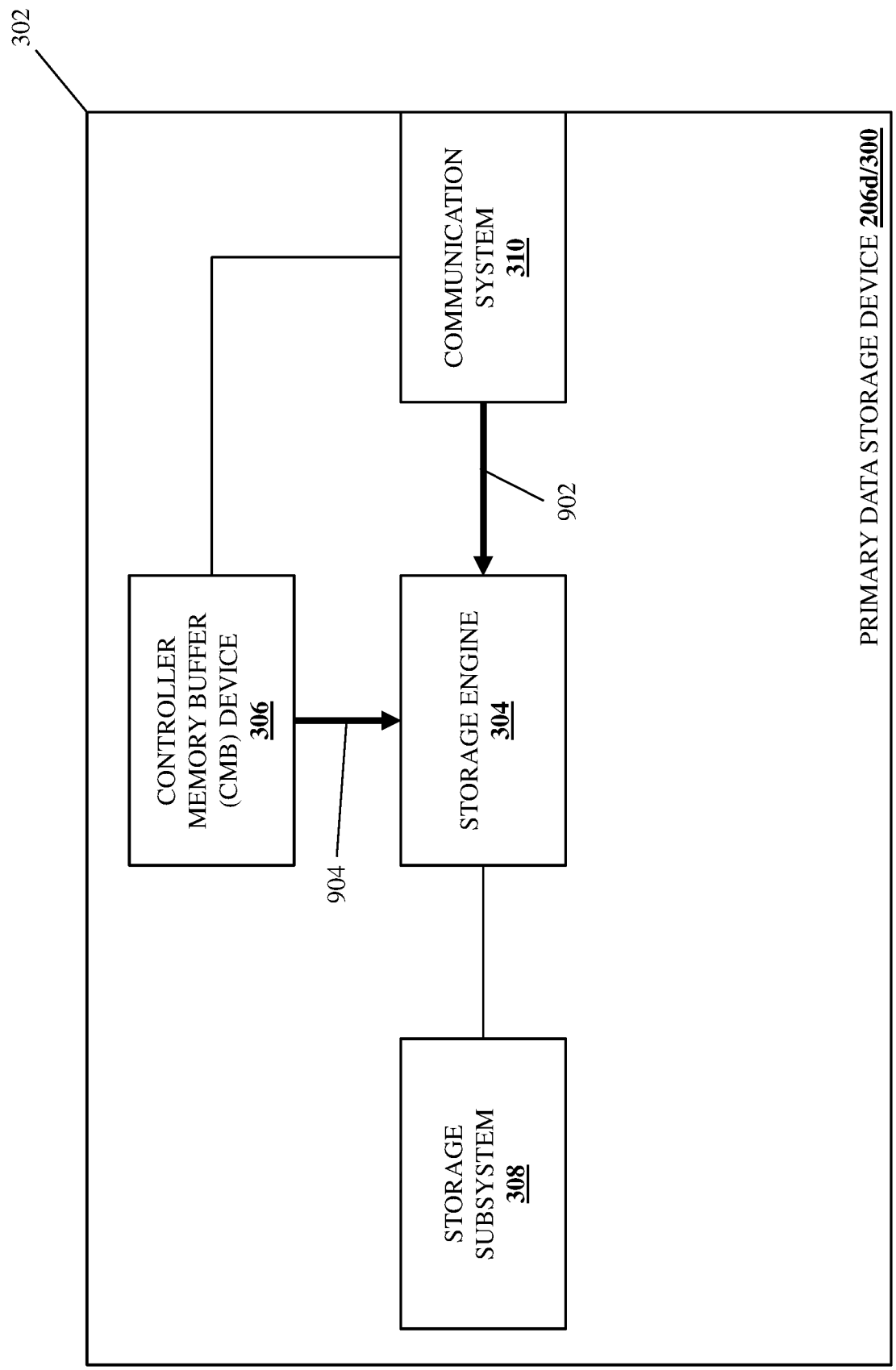

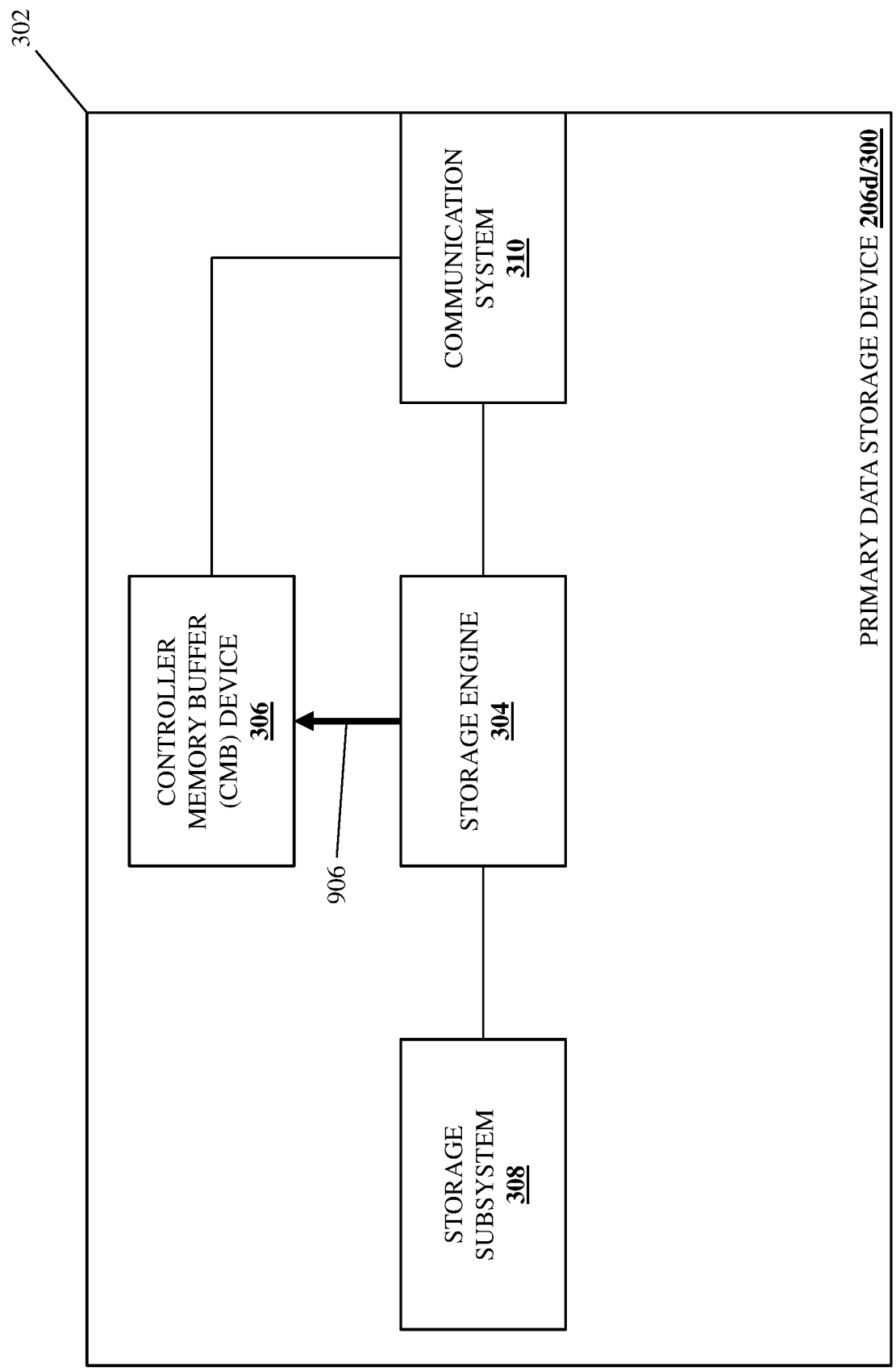

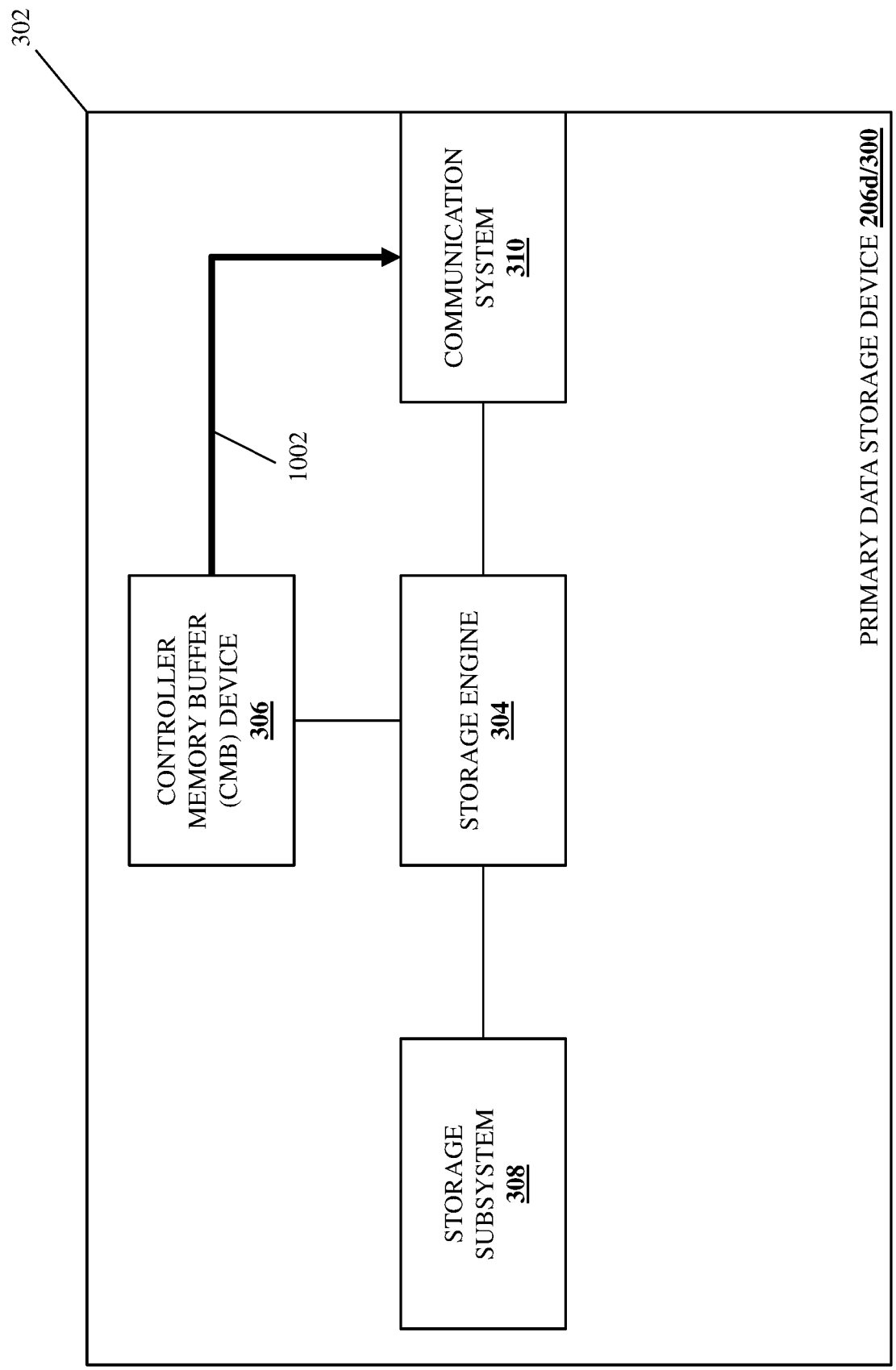

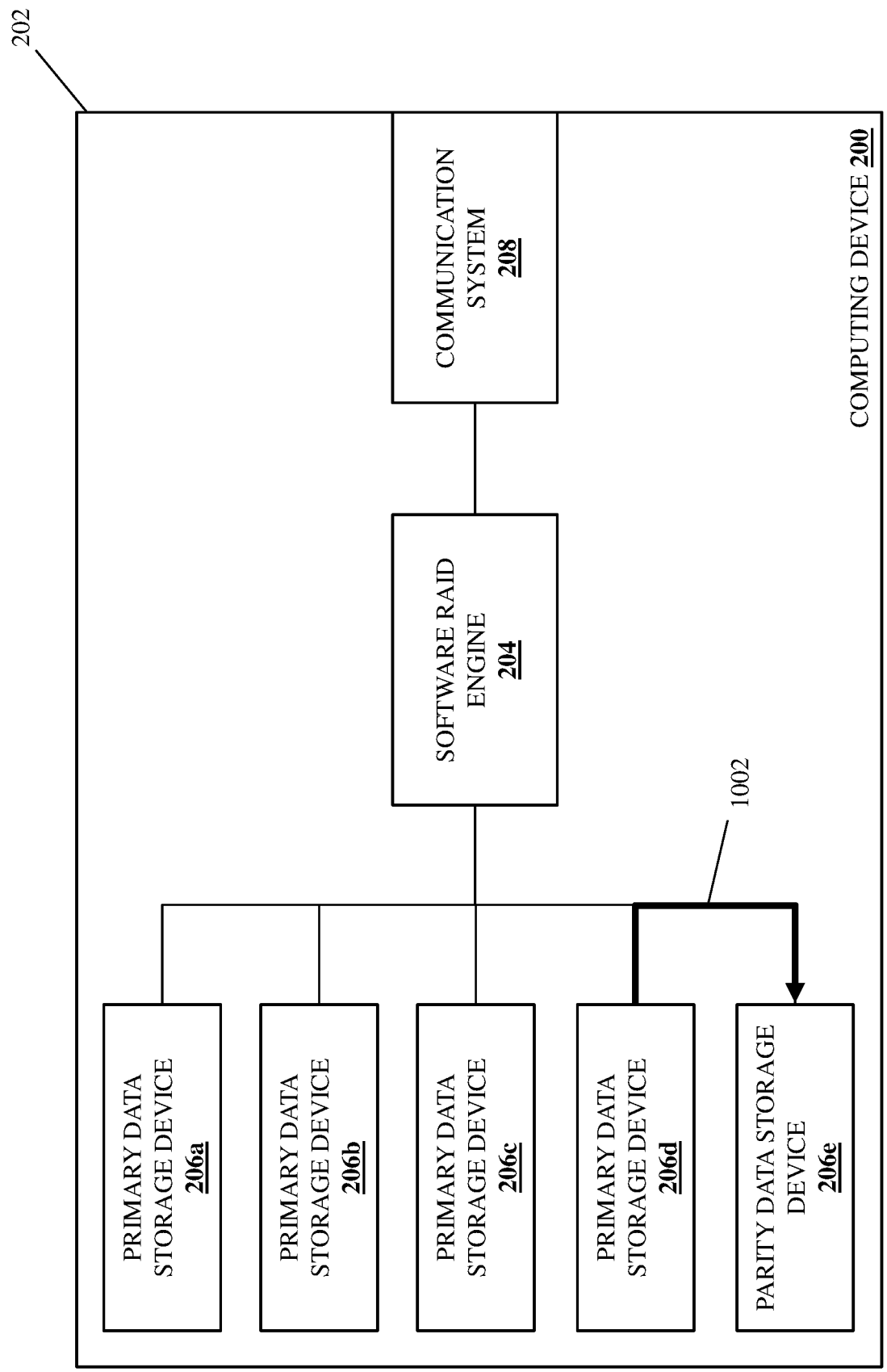

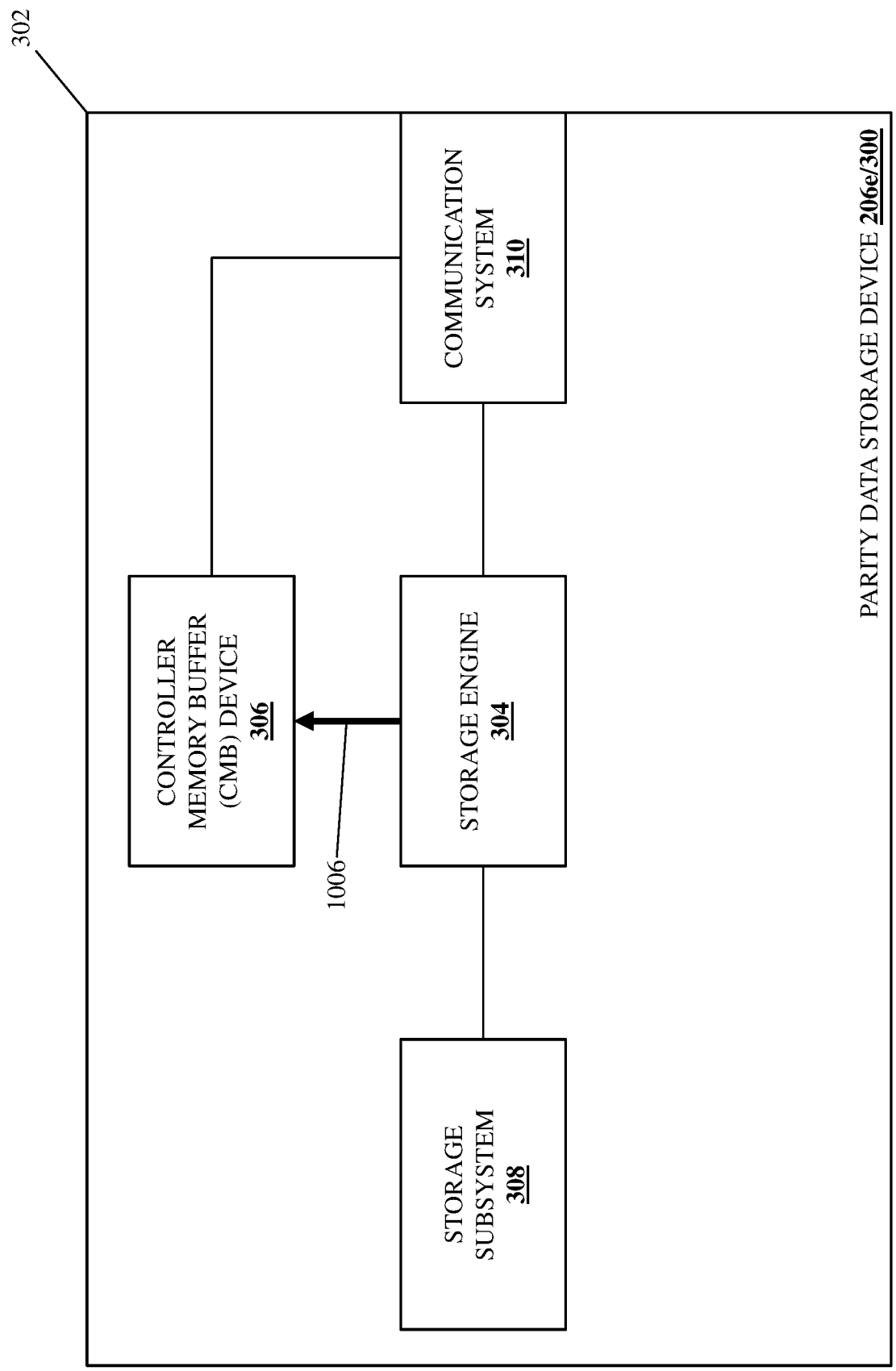

RAID DISTRIBUTED PARITY GENERATION SYSTEM

BACKGROUND

The present disclosure relates generally to information handling systems, and more particularly to distributing the generation of parity data as part of a write operation in a Redundant Array of Independent Disks (RAID) provided by an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, storage systems, and/or other computing devices known in the art, utilize RAID techniques in the storage of their data, which one of skill in the art will recognize is a data storage virtualization technology that combines multiple physical storage devices into one or more logical storage devices for the purposes of data redundancy and/or performance improvements. For example, "RAID5" is a RAID level that provides the benefits discussed above via the use of block-level striping and the distribution of parity data across multiple storage devices, with primary data distributed across multiple storage devices in the form of "stripes", and each stripe including primary data on all but one of the storage devices that instead stores parity data, which one of skill will recognize may be used to provide redundancy and allow for reconstruction of the primary data in the event of a failure of a storage device. However, the inventors of the present disclosure have identified deficiencies in some RAID5 write operations.

For example, write operations in a RAID5 generally fall into three categories: "full stripe" write operations, "Read Modify Write (RMW)" operations, and "data reconstruction" write operations that are each performed by a host that is provided by a processing system such as a Central Processing Unit (CPU) in the server device or storage system. As will be appreciated by one of skill in the art in possession of the present disclosure, full stripe write operations typically occur when the write is the same size as a stripe, and involve the host writing data across all of the storage devices in the RAID such that primary data is written to all but one of those storage devices, and calculated parity data is written to the remaining one of those storage devices. RMW operations typically occur when the write is less than half the size of the stripe, and involve the host reading the "old" primary data and "old" parity data that is going to be overwritten, calculating "new" parity data by perform an XOR operation on the "old" primary data, "old" parity data, and "new" primary data, and writing the new primary data and new parity data to the storage devices. Data reconstruction write operations typically occur when the write is more than half the size of the stripe, and involve the host reading the "old" primary data that is not going to be overwritten, calculating "new" parity data by XORing that "old" primary data with the "new" primary data, and writing the "new" primary data and "new" parity data to the storage devices. The inventors of the present disclosure have identified that requiring the host to read data from the storage devices and perform the parity data calculation in the RMW operations and the data reconstruction write operations described above is processing intensive, impacts the performance of the RAID, and utilizes valuable processing cycles that could otherwise be used to perform other functions by the host.

Accordingly, it would be desirable to provide a RAID write operation system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a Redundant Array of Independent Disk (RAID) engine that is configured to: receive a write instruction that is directed to a logical storage subsystem provided by a plurality of storage devices and that includes new primary data for writing to a subset of the plurality of storage devices; generate, based on the new primary data, first intermediate parity data; provide the first intermediate parity data in a parity data storage device that is included in the plurality of storage devices; cause a first primary data storage device that is not included in the subset of the plurality of storage devices to generate second intermediate parity data using first primary data in the first primary data storage device and respective second primary data in at least one second primary data storage device that is not included in the subset of the plurality of storage devices, and provide the second intermediate parity data in the first primary data storage device; and cause the parity data storage device to generate final parity data using the first intermediate parity data in the parity data storage device and the second intermediate parity data in the first primary data storage device.

BRIEF DESCRIPTION OF THE DRAWINGS

FIG. 7B is a schematic view illustrating an embodiment of the storage device of FIG. 3 operating during the method of FIG. 5.

FIG. 9C is a schematic view illustrating an embodiment of the storage device of FIG. 3 operating during the method of FIG. 5.

FIG. 9D is a schematic view illustrating an embodiment of the computing device of FIG. 4 operating during the method of FIG. 5.

FIG. 9E is a schematic view illustrating an embodiment of the storage device of FIG. 3 operating during the method of FIG. 5.

FIG. 9F is a schematic view illustrating an embodiment of the storage device of FIG. 3 operating during the method of FIG. 5.

FIG. 10C is a schematic view illustrating an embodiment of the storage device of FIG. 3 operating during the method of FIG. 5.

FIG. 10D is a schematic view illustrating an embodiment of the computing device of FIG. 4 operating during the method of FIG. 5.

FIG. 10F is a schematic view illustrating an embodiment of the storage device of FIG. 3 operating during the method of FIG. 5.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
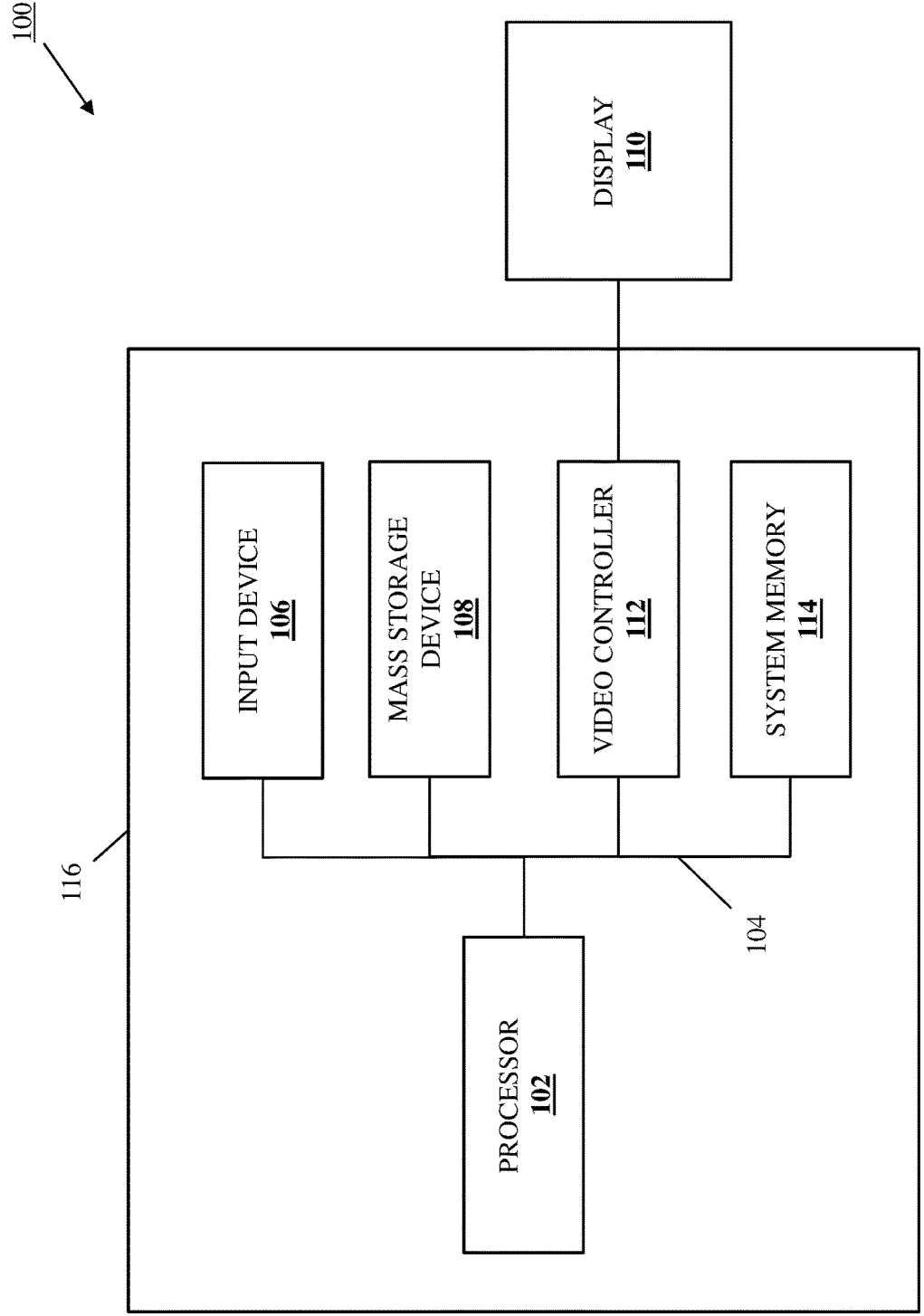
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
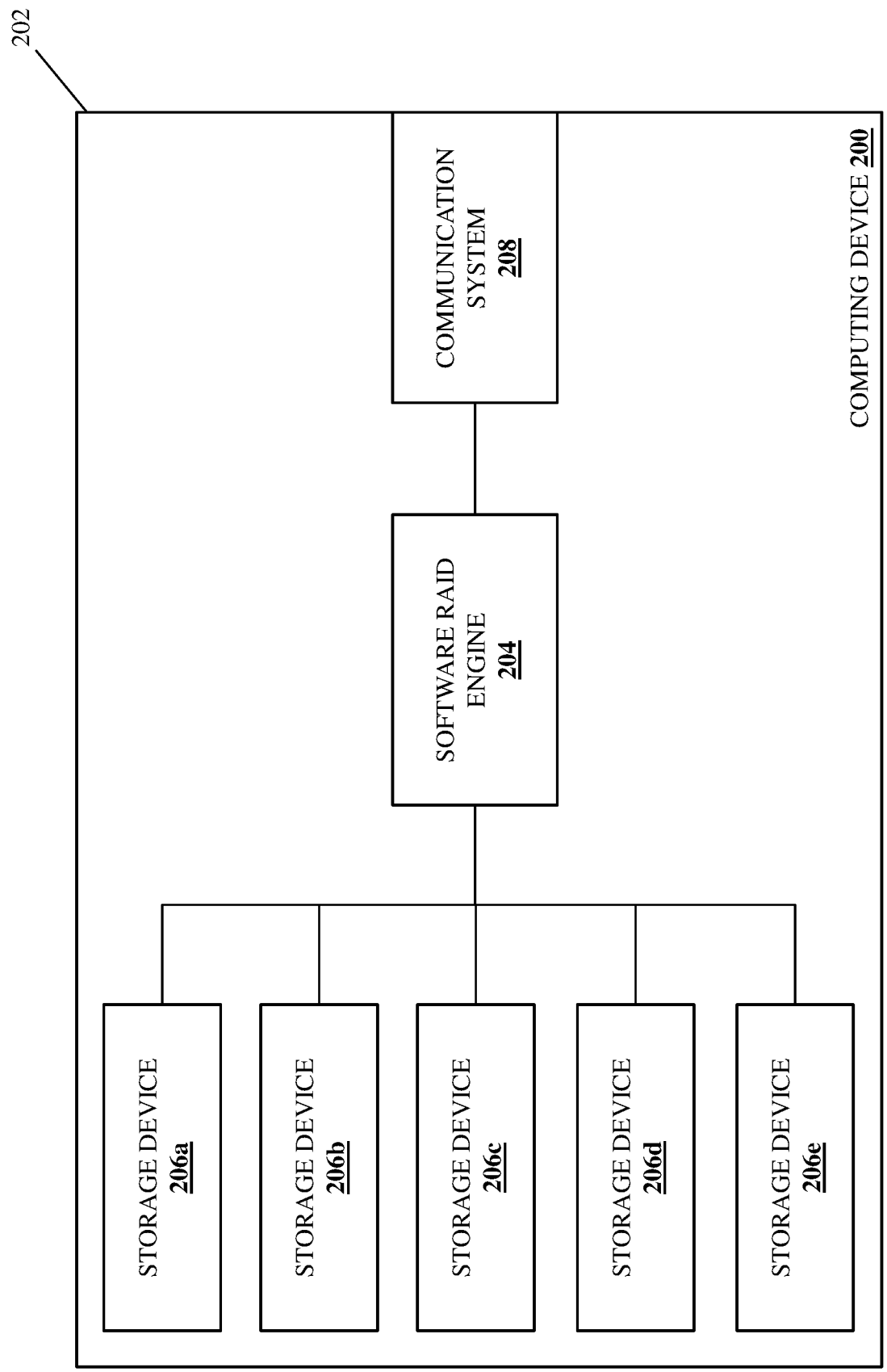
FIG. 2 is a schematic view illustrating an embodiment of a computing device that may provide the RAID distributed parity generation system of the present disclosure.

Referring now to FIG. 2, an embodiment of a computing device 200 is illustrated that may provide the RAID distributed parity generation system of the present disclosure. In an embodiment, the computing device 200 may be provided by the IHS 100 discussed above with reference to FIG. 1 and/or may include some or all of the components of the IHS 100, and in specific examples may be provided by a server device, storage system, and/or other computing devices that one of skill in the art in possession of the present disclosure would recognize as benefiting from the RAID technology improvements described herein. Furthermore, while illustrated and discussed as being provided by a computing device 200, one of skill in the art in possession of the present disclosure will recognize that the functionality of the computing device 200 discussed below may be provided by other devices that are configured to operate similarly as the computing device 200 discussed below. In the illustrated embodiment, the computing device 200 includes a chassis 202 that houses the components of the computing device 200, only some of which are illustrated and described below.

For example, the chassis 202 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a software RAID engine 204 that is configured to perform the functionality of the software RAID engines, software RAID subsystems, and/or computing devices discussed below. As will be appreciated by one of skill in the art in possession of the present disclosure, the software RAID engine 204 may be provided by an operating system (or specialized software) and using a Central Processing Unit (CPU) in the computing device 200 in order to manage the RAID described below, handle the distribution of data across the RAID, provide RAID fault tolerance mechanisms, and/or perform other RAID functionality known in the art. However, while described as a software RAID engine performing RAID level 5 ("RAID5") operations below, one of skill in the art in possession of the present disclosure will appreciate how the software RAID engine 204 may be replaced by a RAID engine provided by a hardware RAID subsystem such as, for example, a dedicated RAID controller device that handles the RAID management and presents the logical storage device provided via the RAID to an operating system, and/or may operate at other RAID levels, while remaining within the scope of the present disclosure as well.

The chassis 202 may also house a storage system that, in the illustrated embodiments, includes a plurality of storage devices 206a, 206b, 206c, 206d, and 206e that are each coupled to the software RAID engine 204 (e.g., via a coupling between each storage device and the processing system). As discussed below, the storage devices 206a-206e may be provided by physical storage devices that have been configured using RAID techniques to provide one or more logical storage devices having one or more logical storage subsystems, but one of skill in the art in possession of the present disclosure will appreciate how storage devices may be configured using RAID techniques in a variety manners that will benefit from the teachings of the present disclosure as well. One of skill in the art in possession of the present disclosure will recognize how, in the specific embodiments described below, the storage devices 206a-206e are provided by Non-Volatile Memory express (NVMe) storage devices, but will appreciate how other storage device types and/or technology may enable the functionality described below while remaining within the scope of the present disclosure as well.

The chassis 202 may also house a communication system 208 that is coupled to the software RAID engine 204 (e.g., via a coupling between the communication system 208 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific computing device 200 has been illustrated and described, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the RAID distributed parity generation functionality discussed below, while remaining within the scope of the present disclosure as well.

Figure 3:
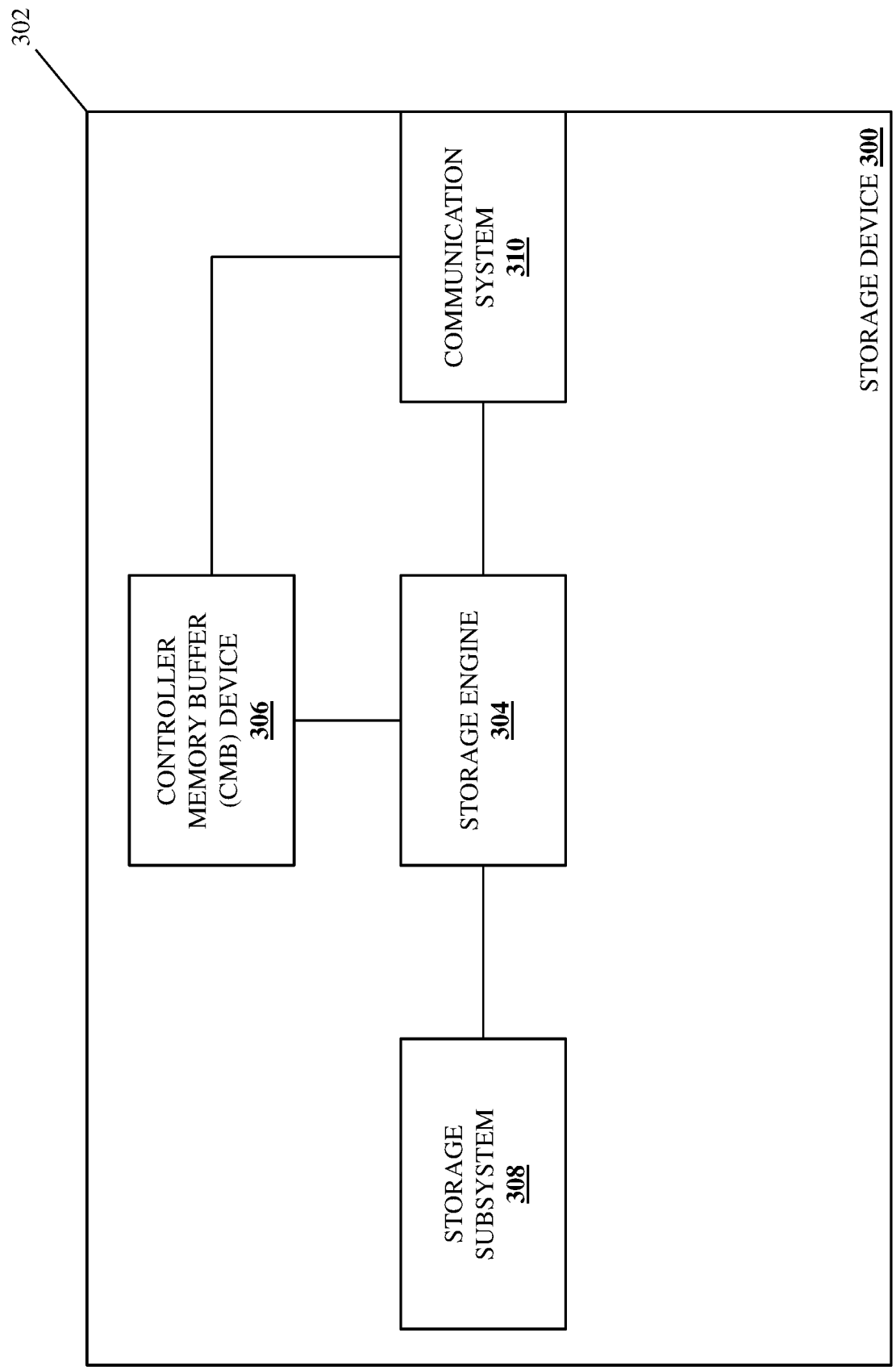
FIG. 3 is a schematic view illustrating an embodiment of a storage device that may be provided in the computing device of FIG. 2.

Referring now to FIG. 3, an embodiment of a storage device 300 is illustrated that may provide any or each of the storage devices 206a-206e discussed above with reference to FIG. 2. As such, the storage device 300 may be provided the IHS 100 discussed above with reference to FIG. 1 (e.g., as the storage device 108), and in the specific examples below is described as being provided by an NVMe storage device. However, while illustrated and discussed as being provided by an NVMe storage device, one of skill in the art in possession of the present disclosure will recognize that the functionality of the storage device 300 discussed below may be provided by other types of storage devices that are configured to operate similarly as the storage device 300 discussed below. In the illustrated embodiment, the storage device 300 includes a chassis 302 that houses the components of the storage device 300, only some of which are illustrated and described below.

For example, the chassis 302 may house a processing system (not illustrated, but which may include processing components provided by storage firmware) and a memory system (not illustrated, but which may include memory components provided by storage firmware) that is coupled to the processing system and that includes instructions that, when executed by the processing system, cause the processing system to provide a storage engine 304 that is configured to perform the functionality of the storage engines and/or storage devices discussed below. As will be appreciated by one of skill in the art in possession of the present disclosure, the storage engine 304 in the storage device 300 may be configured to perform the internal data transfers, the peer-to-peer data transfers with other storage devices, the XOR operations on data stored at designated addresses, and/or any of the other functionality described below. In a specific example, any of the operations performed by the storage engine 304 may be instructed via vendor-specific commands defined for the storage device 300 and received from software RAID subsystems/engines, other storage engines in other storage devices, and/or from any other entity that would be apparent to one of skill in the art in possession of the present disclosure.

The chassis 302 may also house memory subsystem that is coupled to the storage engine 304 (e.g., via a coupling between the memory subsystem and the processing system) and that, in the illustrated embodiment, is provided by a Controller Memory Buffer (CMB) device 306 that one of skill in the art in possession of the present disclosure will recognize is available in NVMe storage devices. However, one of skill in the art in possession of the present disclosure will appreciate how the CMB device 306 may be replaced by other memory subsystems in other types of storage devices while remaining within the scope of the present disclosure as well. The chassis 302 may also house a storage subsystem 308 that is coupled to the storage engine 304 (e.g., via a coupling between the storage subsystem 308 and the processing system) and that may be provided by NAND devices and/or other solid-state storage components that one of skill in the art in possession of the present disclosure will recognize are available in NVMe storage devices, as well as other types of storage subsystems utilized in other types of storage devices as well.

The chassis 302 may also house a communication system 308 that is coupled to the storage engine 304 (e.g., via a coupling between the communication system 308 and the processing system) and that may be provided by any of a variety of storage device communication components that would be apparent to one of skill in the art in possession of the present disclosure. However, while a specific storage device 300 has been illustrated and described, one of skill in the art in possession of the present disclosure will recognize that storage devices (or other devices operating according to the teachings of the present disclosure in a manner similar to that described below for the storage device 300) may include a variety of components and/or component configurations for providing conventional storage device functionality, as well as RAID distributed parity generation functionality discussed below, while remaining within the scope of the present disclosure as well.

Figure 4:
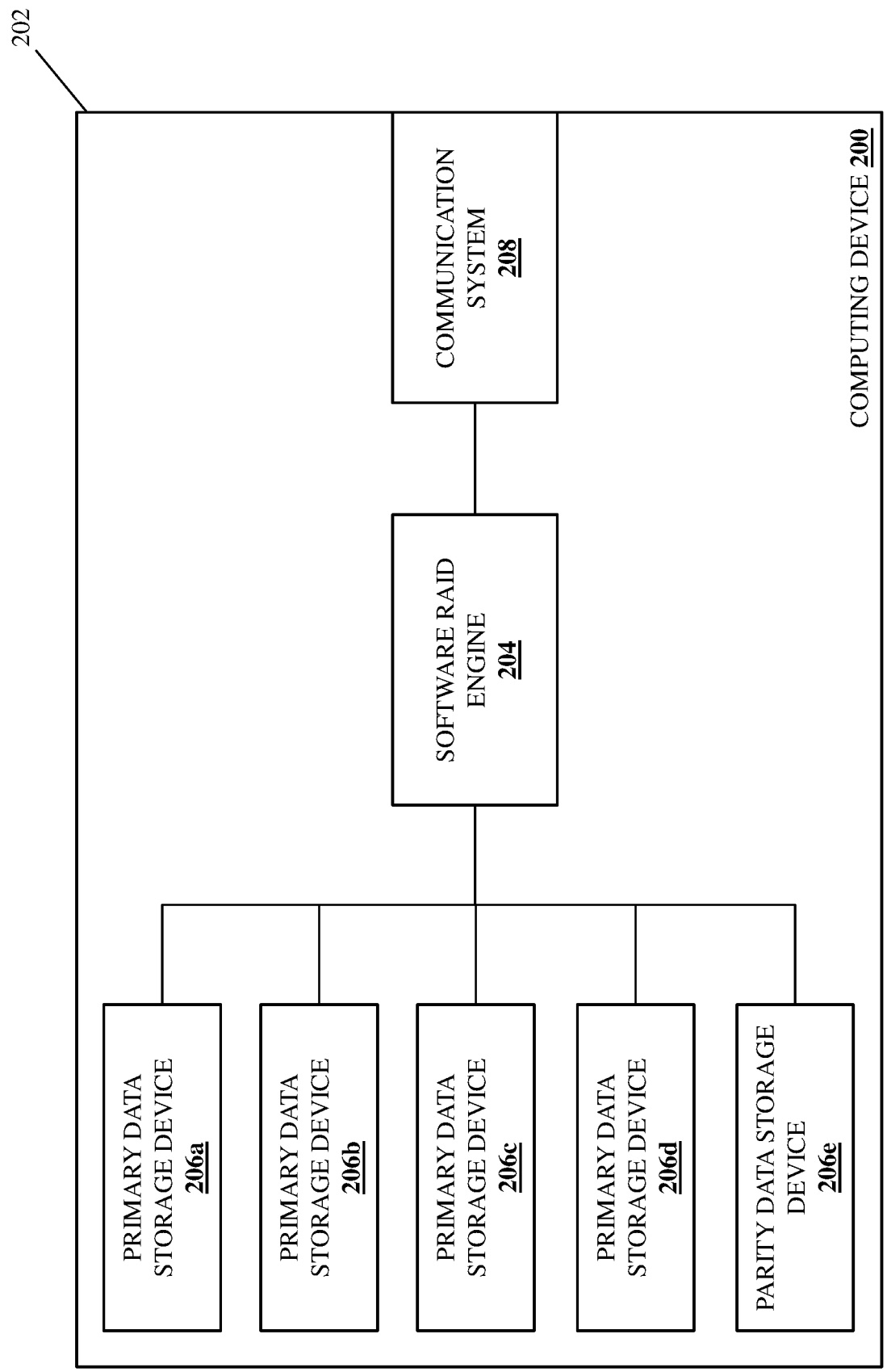
FIG. 4 is a schematic view illustrating an embodiment of the computing device of FIG. 2 during its operation.

With reference to FIG. 4, an embodiment of the operation of the computing device 200 discussed above with reference to FIG. 2 is illustrated for the purposes of discussion below. As will be appreciated by one of skill in the art in possession of the present disclosure, the embodiment of the computing device 200 illustrated in FIG. 4 and described below names the storage devices 206a-206e for the type of data they store in a particular RAID "stripe" of data in the logical storage device(s)/logical storage subsystem(s) provided by the storage subsystem, with that RAID stripe including primary data that is stored in the "primary data" storage devices 206a, 206b, 206c, and 206d, as well as parity data that is stored in the "parity data" storage device 206e. However, one of skill in the art in possession of the present disclosure will also appreciate how other RAID stripes of data stored in the logical storage device(s)/logical storage subsystem(s) provided by the storage subsystem will include primary data and parity data that is stored on different combinations of the storage devices 206a-206e, and thus the examples below simply describe the RAID distributed parity generation functionality of the present disclosure as it applies to a single RAID stripe, but may be applied to any RAID stripe with primary data and parity data stored in any combination on the storage devices 206a-206e.

Figure 5:
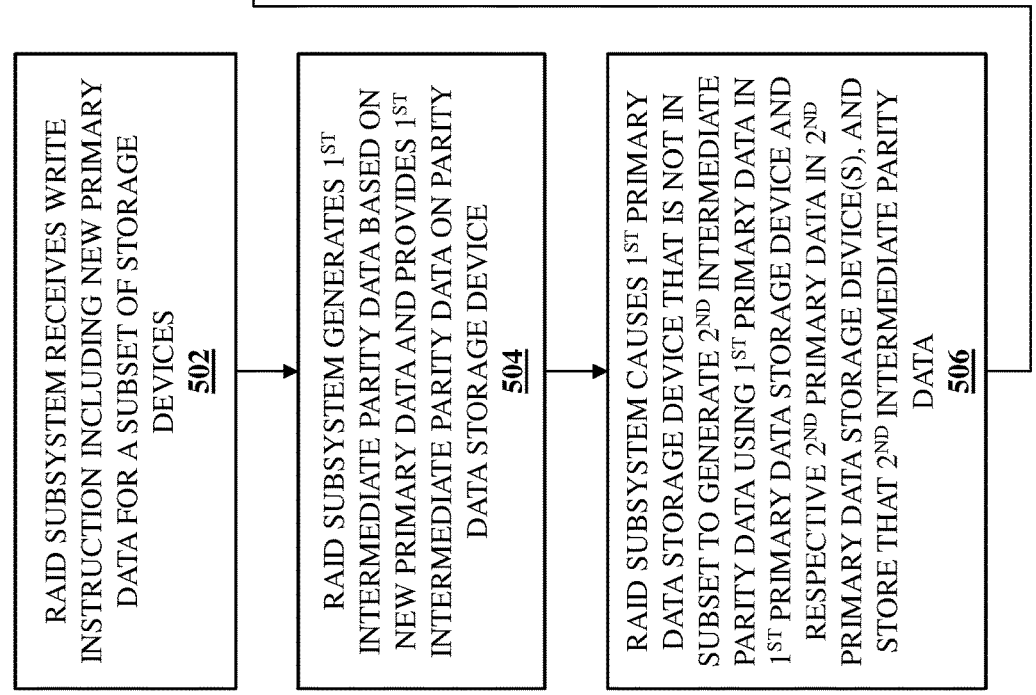
FIG. 5 is a flow chart illustrating an embodiment of a method for distributing RAID parity generation.

Referring now to FIG. 5, an embodiment of a method 500 for distributing Redundant Array of Independent Disk (RAID) parity generation is illustrated. As discussed below, the systems and methods of the present disclosure distribute the generation of parity data, when performing data reconstruction write operations with only full strip writes, between a software RAID subsystem and the storage device(s) that will store that parity data along with the primary data from which it was generated. For example, the RAID distributed parity generation system of the present disclosure may include a chassis housing a RAID subsystem coupled to storage devices. The RAID subsystem receives a write instruction including new primary data for a subset of the storage devices that it uses to generate first intermediate parity data that it provides in a parity data storage device. The RAID engine then causes a first primary data storage device that is not in the subset to generate second intermediate parity data using its first primary data and respective second primary data in second primary data storage device(s) that are not in the subset, and provide the second intermediate parity data in the first primary data storage device. The RAID subsystem then causes the parity data storage device to generate final parity data using the first intermediate parity data and the second intermediate parity data. As such, the processing required by the software RAID engine to generate parity data is reduced, allowing its processing system to be utilized for other software RAID operations.

Figure 6:
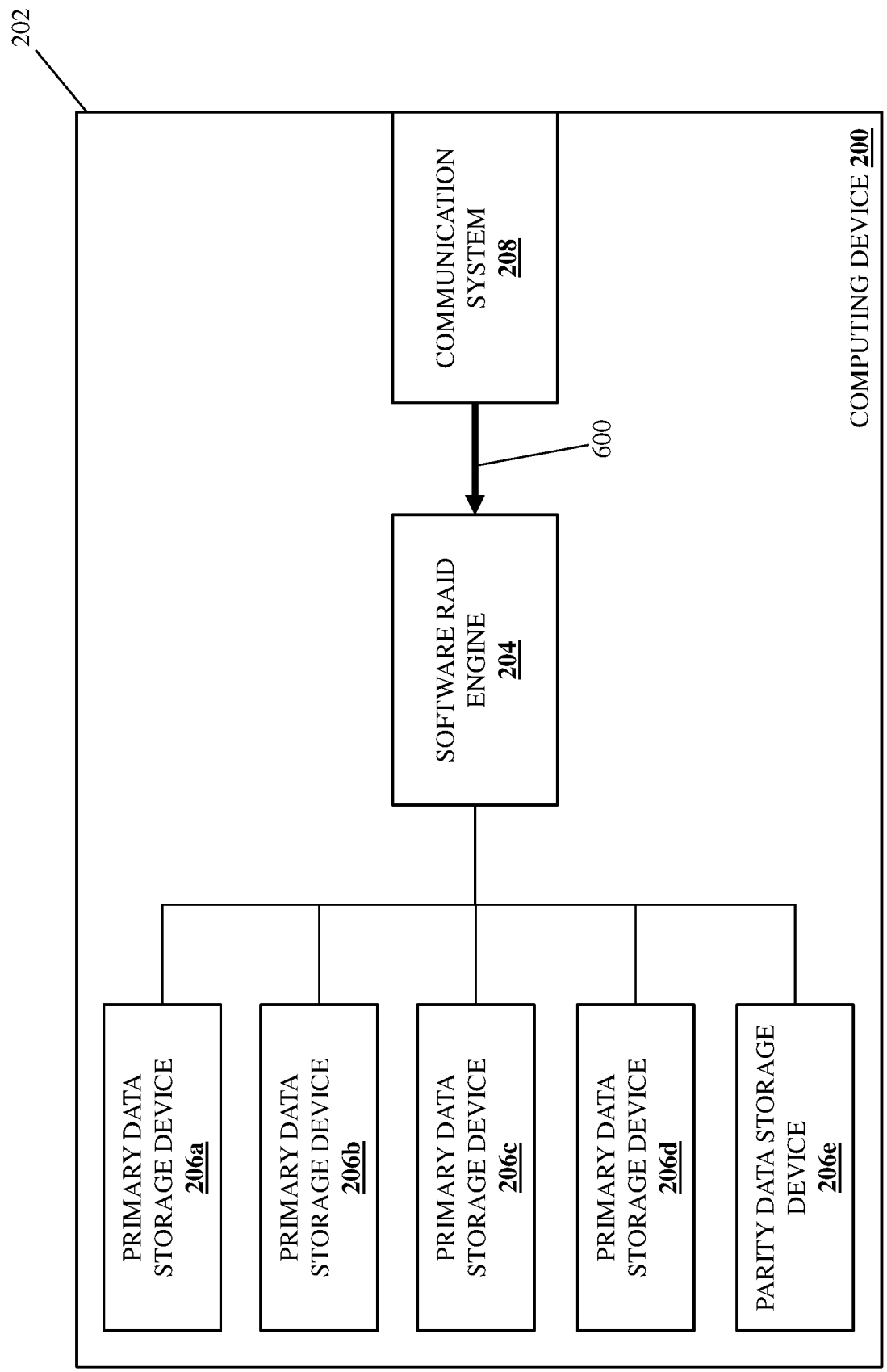
FIG. 6 is a schematic view illustrating an embodiment of the computing device of FIG. 4 operating during the method of FIG. 5.

The method 500 begins at block 502 where a RAID subsystem receives a write instruction including new primary data for a subset of storage devices. With reference to FIG. 6, in an embodiment of block 502, the software RAID engine 204 in the computing device 200 may perform write instruction receiving operations 600 that, in the illustrated example, include receiving a write instruction via its communication system 208 (e.g., from a user via an input device coupled to the communication system 208). However, while illustrated as being received via the communication system 208, one of skill in the art in possession of the present disclosure will appreciate how the write instruction may be received from within the computing device 200 (e.g., from an operating system in the computing device 200) while remaining within the scope of the present disclosure as well.

In the specific examples provided for the discussion of the method 500 below, the write instruction includes "new" primary data (i.e., that will replace "old" primary data), and instructs a data reconstruction write operation to write the new primary data to the primary data storage devices 206a and 206b (i.e., the subset of primary data storage devices 206a-206d). Furthermore, the writing of that new primary data in the specific examples provided for the discussion of the method 500 below includes "full strip" writes to each of the primary data storage devices 206a and 206b (i.e., all of the portion of the data (i.e., the strip) provided by each of the primary data storage devices 206a and 206b for the stripe at issue will be written). As will be appreciated by one of skill in the art in possession of the present disclosure, while the simplified example provided for the discussion of the method 500 involves the writing of half of the stripe provided by the primary data storage devices 206a-206d, data reconstruction write operations are typically performed when more than half of the stripe is being written to, and thus may be applied to such situations while remaining within the scope of the present disclosure.

The method 500 then proceeds to block 504 where the RAID subsystem generates first intermediate parity data based on the new primary data, and provides the first intermediate parity data on a parity data storage device. In an embodiment, at block 504, the software RAID engine 204 in the computing device 200 may perform first intermediate parity generation operations that include using the new primary data received in the write instruction at block 502 to generate first intermediate parity data. For example, at block 504, the software RAID engine 504 may perform an XOR operation using a first portion of the new primary data that will be provided for storage on the primary data storage device 206a (i.e., as part of the full strip write to that primary data storage device 206a as discussed above) and a second portion of the new primary data that will be provided for storage on the primary data storage device 206b (i.e., as part of the full strip write to that primary data storage device 206b as discussed above), as indicated by the equation below:

First intermediate parity data=$XOR$ [$STRIP_{206a}$, $STRIP_{206b}$]

Figure 7A:
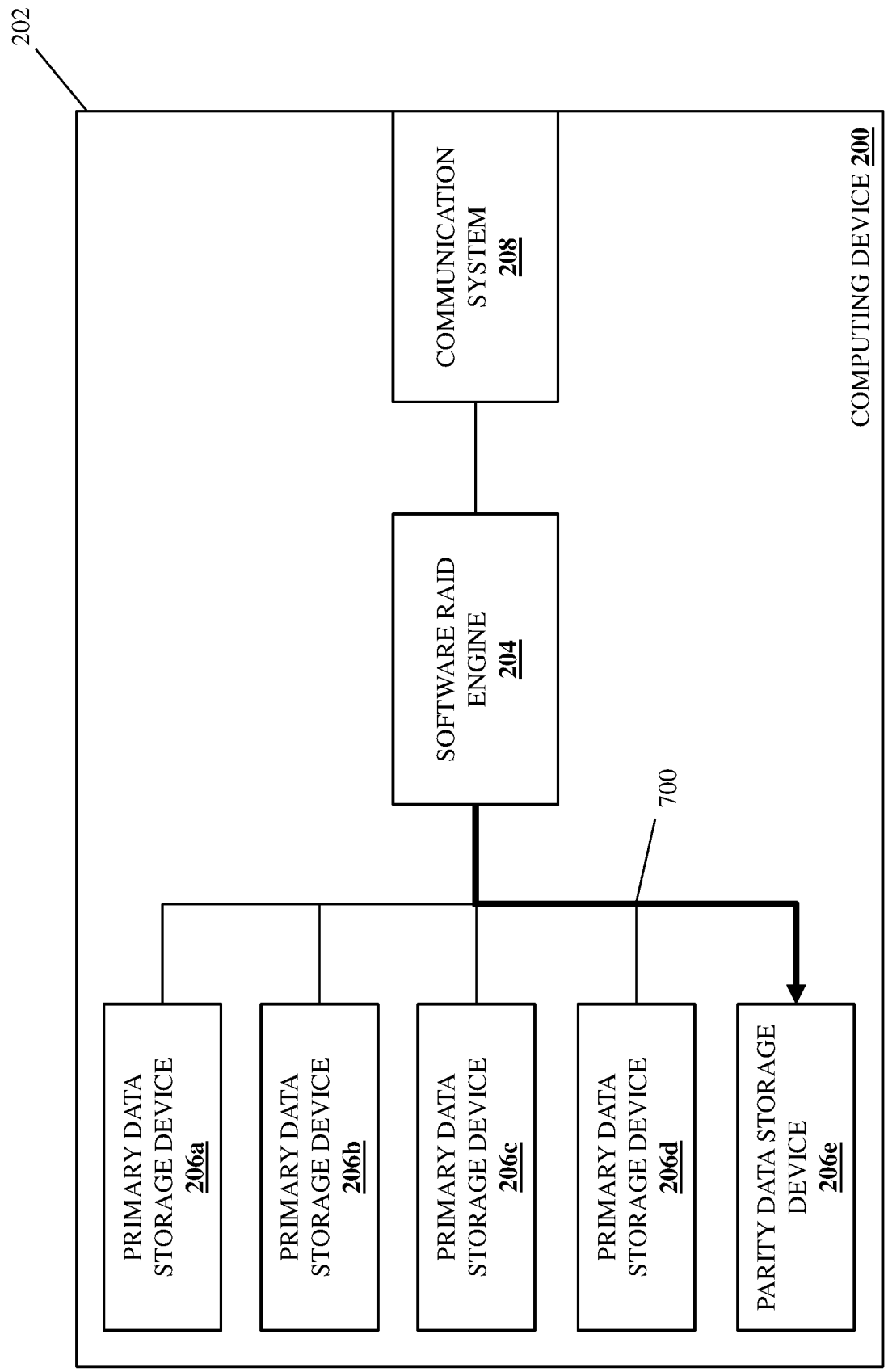
FIG. 7A is a schematic view illustrating an embodiment of the computing device of FIG. 4 operating during the method of FIG. 5.

With reference to FIGS. 7A and 7B, the software RAID engine 204 may then perform first intermediate parity data storage operations 700 that may include storing, using the communication system in the parity data storage device 206e/300, the first intermediate parity data in the CMB device 306 in the parity data storage device 206e/300 (e.g., via a vendor-specific command as discussed above).

As will be appreciated by one of skill in the art in possession of the present disclosure, the simplified example provided herein includes only two primary data storage devices that will receive full strip writes as part of the data reconstruction write operation instructed as part of the write instruction received at block 502, and thus the first intermediate parity data may be generated via the XOR operation on the full strip of new primary data that will be written to each of those data storage devices as described above. However, one of skill in the art in possession of the present disclosure will appreciate how the first intermediate parity data may be generated when additional primary data storage devices exist that will receive full strip writes as part of the data reconstruction write operation as well.

For example, the first intermediate parity data generation operations may be generated by sequential XOR operations using the full strip of new primary data that will be stored on each of the primary data storage devices as part of the data reconstruction write operation. To provide another simplified example in which there are more than two primary data storage devices that will receive full strip writes as part of the data reconstruction write operation, a first XOR operation may be performed on the full strip of new primary data for first and second primary data storage devices (i.e., XOR [$STRIP_{1st}$, $STRIP_{2nd}$]), a second XOR operation may be performed on the result of the first XOR operation and the full strip of new primary data for the third primary data storage device (i.e., XOR [$STRIP_{3rd}$, (XOR [$STRIP_{1st}$, $STRIP_{2nd}$])]), and so on until the last XOR operation generates the first intermediate parity data.

In another example, the first intermediate parity data generation operations may be generated by parallel XOR operations using the full strip of new primary data for each of the primary data storage devices that will be written to as part of the data reconstruction write operation. To provide another simplified example in which there are four primary data storage devices that will receive full strip writes as part of the data reconstruction write operation, a first XOR operation may be performed on the full strip of new primary data for the first and second primary data storage devices (i.e., XOR [$STRIP_{1st}$, $STRIP_{2nd}$]), a second XOR operation may be performed on the full strip of new primary data for the third and fourth primary data storage devices (i.e., XOR [$STRIP_{3rd}$, $STRIP_{4th}$]), and a third XOR operation may be performed on the results of the first and second XOR operations (i.e., XOR [(XOR [$STRIP_{1st}$, $STRIP_{2nd}$]), (XOR [$STRIP_{3rd}$, $STRIP_{4th}$])]) to generate the first intermediate parity data. One of skill in the art in possession of the present disclosure will appreciate how this parallel XOR operation example may be extended out to additional numbers of primary data storage devices, as well as how the sequential XOR operations and parallel XOR operations may be combined in order to generate the first intermediate parity data as well.

Figure 8A:
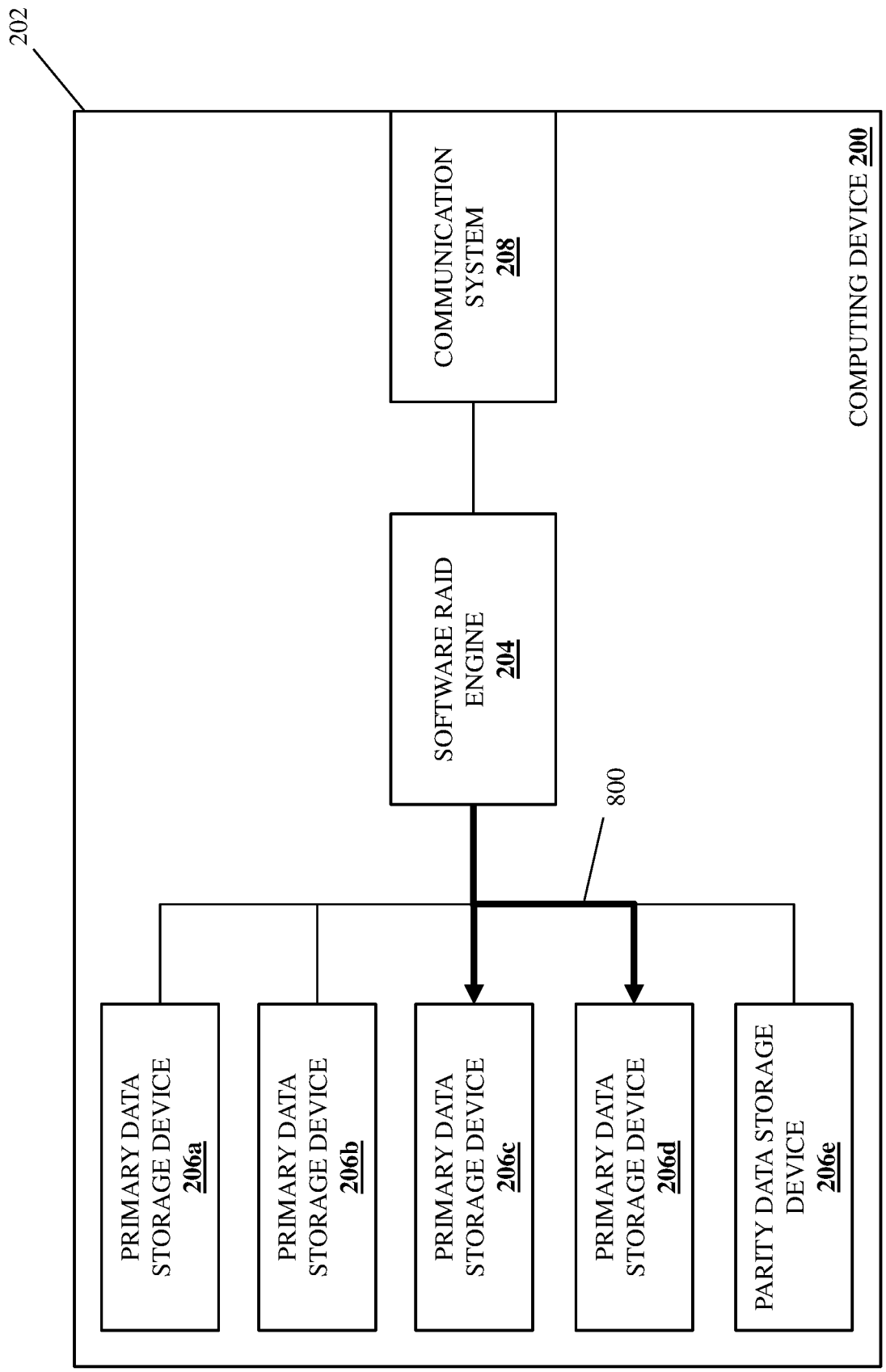
FIG. 8A is a schematic view illustrating an embodiment of the computing device of FIG. 4 operating during the method of FIG. 5.
Figure 8B:
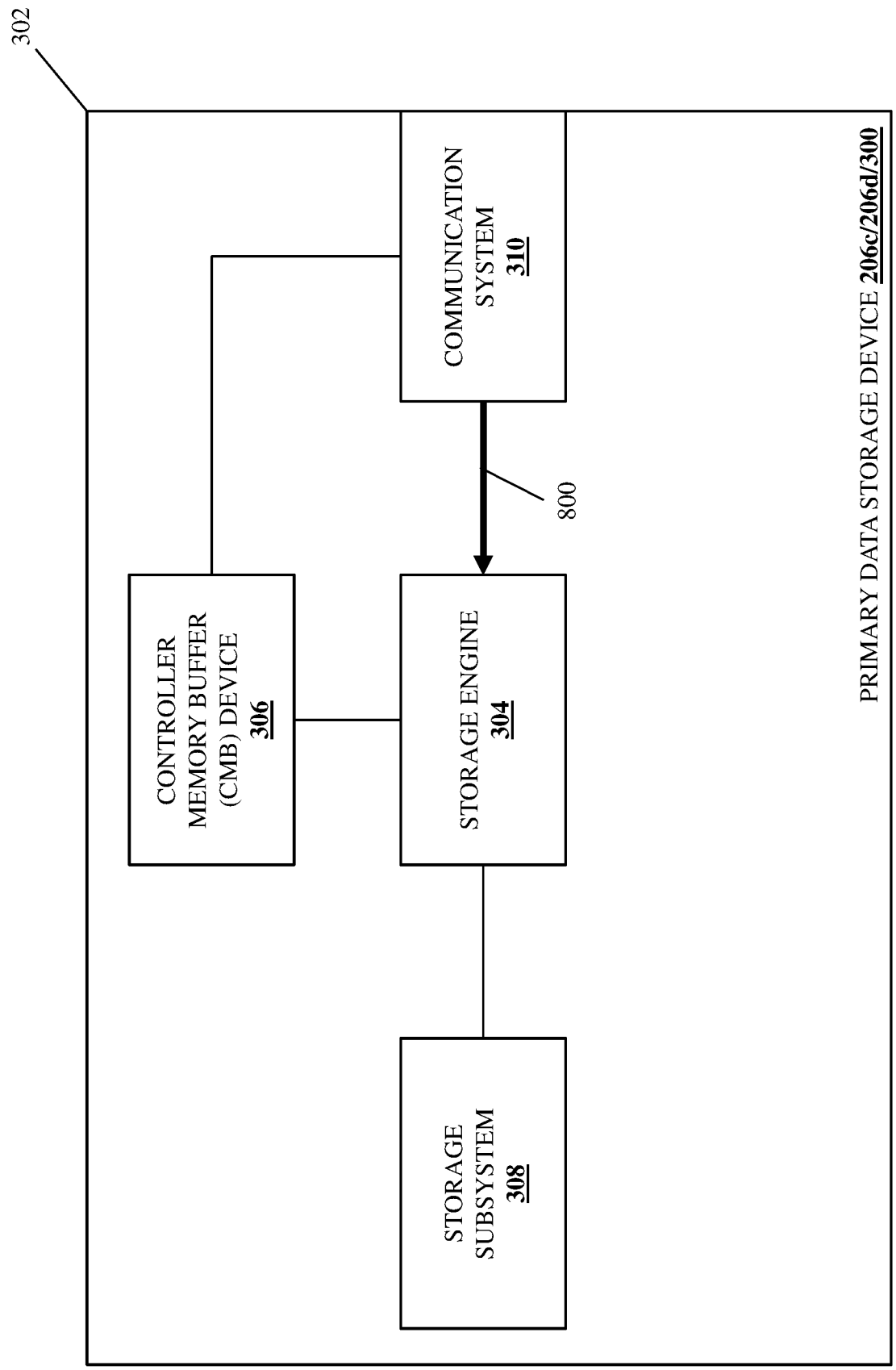
FIG. 8B is a schematic view illustrating an embodiment of the storage device of FIG. 3 operating during the method of FIG. 5.

The method 500 then proceeds to block 506 where the RAID subsystem causes a first primary data storage device that is not in the subset to generate second intermediate parity data using first primary data in the first primary data storage device and respective second primary data in at least one second primary data storage device, and provide that second intermediate parity data in the first primary data storage device. With reference to FIGS. 8A and 8B, in an embodiment of block 506, the software RAID engine 204 in the computing device 200 may perform primary data transfer instruction operations 800 that may include transmitting a respective primary data transfer instruction (e.g., via a vendor-specific command as described above) to the respective storage engine 304 in each of the primary data storage devices 206c and 206d via their respective communication subsystems 310. As such, at block 506, each of the primary data storage devices 206c and 206d that will not be written to as part of the data reconstruction write operation instructed as part of the write instruction received at block 502 will receive a respective primary data transfer instruction.

Figure 8C:
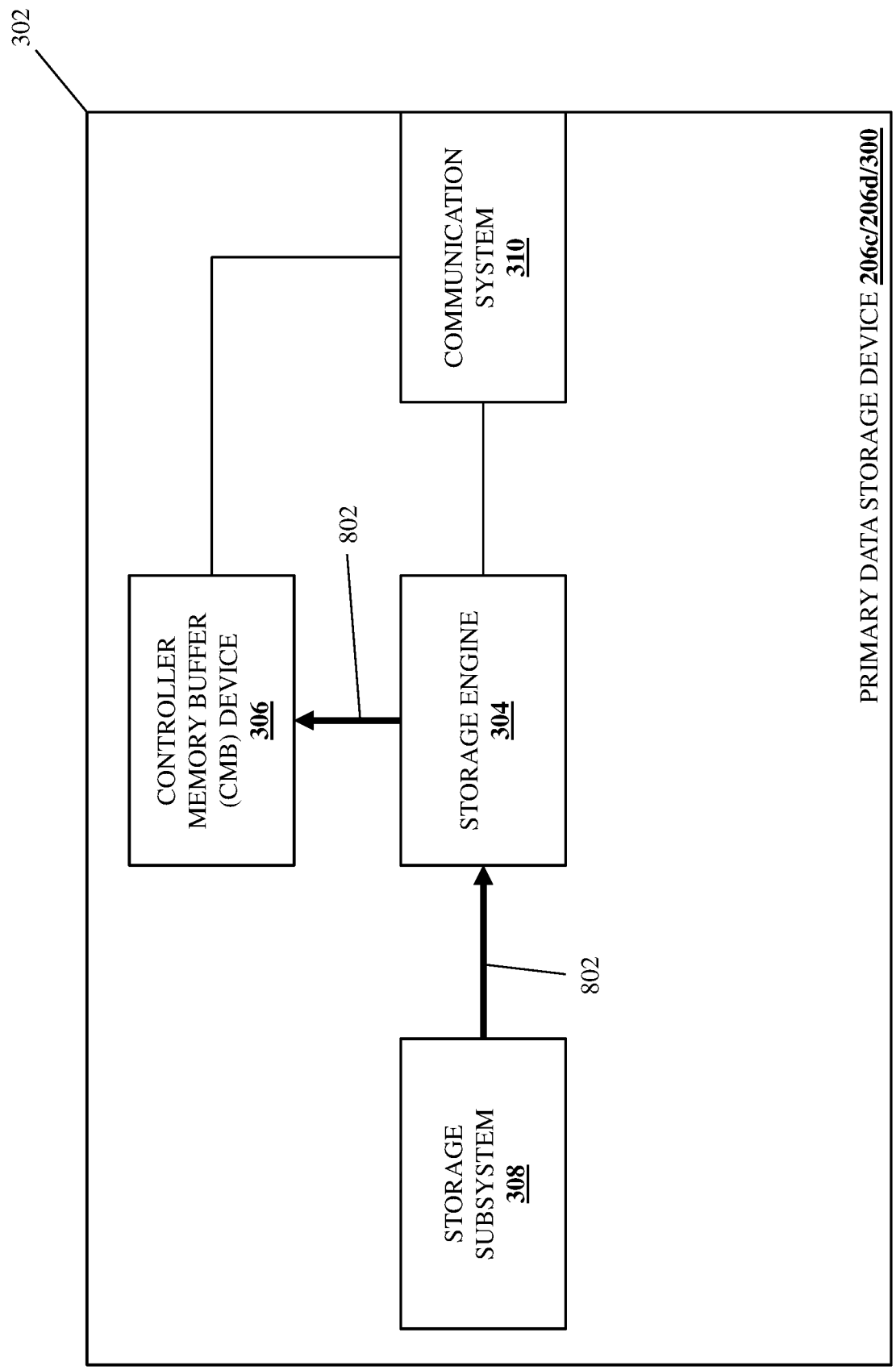
FIG. 8C is a schematic view illustrating an embodiment of the storage device of FIG. 3 operating during the method of FIG. 5.

With reference to FIG. 8C, at block 506 and in response to receiving the respective primary data transfer instructions, the storage engine 304 in each of the primary data storage devices 206c/300 and 206d/300 will perform data transfer operations 802, with the primary data storage device 206c/300 transferring its full strip of primary data for the stripe at issue from its storage subsystem 308 to its CMB device 306, and the primary data storage device 206d/300 transferring its full strip of primary data for the stripe at issue from its storage subsystem 308 to its CMB device 306.

Figure 9A:
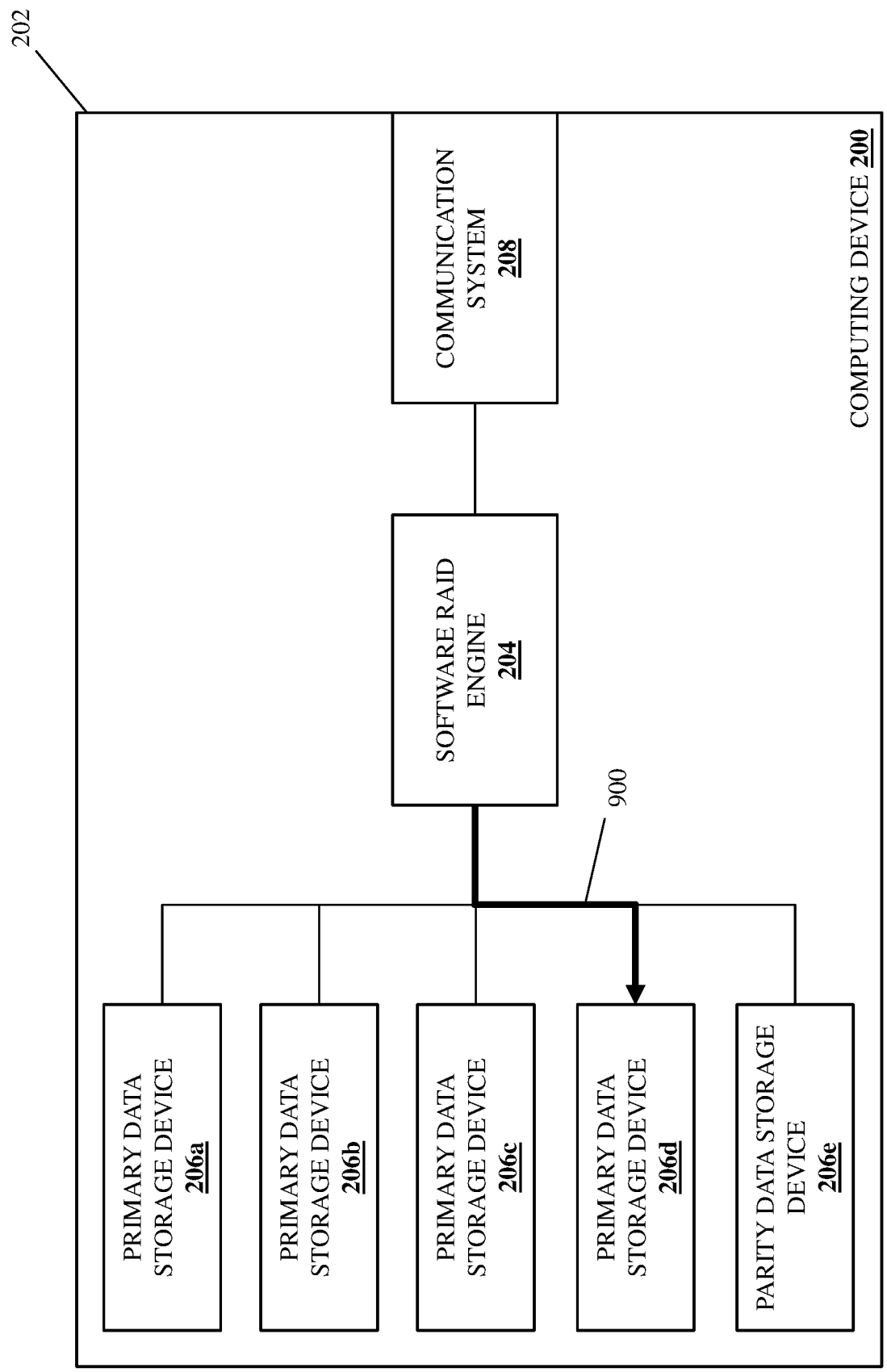
FIG. 9A is a schematic view illustrating an embodiment of the computing device of FIG. 4 operating during the method of FIG. 5.
Figure 9B:
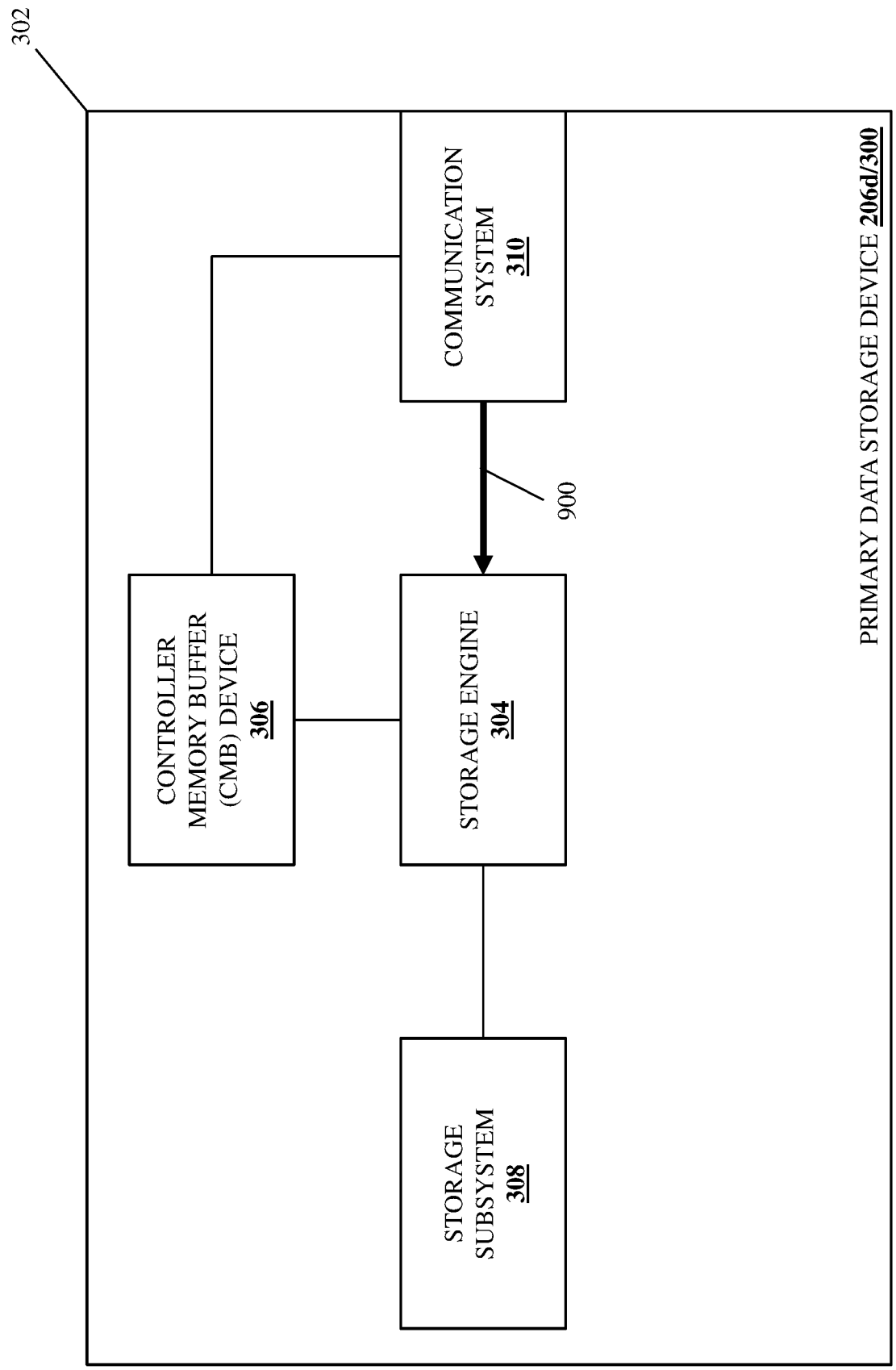
FIG. 9B is a schematic view illustrating an embodiment of the storage device of FIG. 3 operating during the method of FIG. 5.

With reference to FIGS. 9A and 9B, in an embodiment of block 506 and following the transmission of the primary data transfer instructions, the software RAID engine 204 in the computing device 200 may perform second intermediate parity data generation instruction operations 900 that may include transmitting a second intermediate parity data generation instruction (e.g., via a vendor-specific command as described above that includes an XOR command along with the address identifying the location of the primary data that is the subject of the XOR operation) to the storage engine 304 in the primary data storage device 206d via its communication subsystem 310.

With reference to FIGS. 9C, 9D, and 9E, at block 506 and in response to receiving the second intermediate parity data generation instruction, the storage engine 304 in the primary data storage device 206d/300 may perform primary data retrieval operations 902 that include retrieving the full strip of primary data stored by the primary data storage device 206c/300 for the stripe at issue from the CMB device 306 in the primary data storage device 206c/300 via the respective communication subsystems 310 in the primary data storage devices 206c/300 and 206d/300 (e.g., using the address for that primary data included in the vendor-specific command discussed above). The storage engine 304 in the primary data storage device 206d/300 may then perform primary data retrieval operations 904 that include retrieving the full strip of primary data stored by the primary data storage device 206d/300 for the stripe at issue from the CMB device 306 in the primary data storage device 206d/300 (e.g., using the address for that primary data included in the vendor-specific command discussed above).

The storage engine 304 in the primary data storage device 206d/300 may then perform second intermediate parity data generation operations that include using the full strip of primary data stored by the primary data storage device 206c/300 for the stripe at issue, and the full strip of primary data stored by the primary data storage device 206d/300 for the stripe at issue, to generate second intermediate parity data. For example, at block 506, the storage engine 304 in the primary data storage device 206d/300 may perform an XOR operation using the full strip of primary data stored by the primary data storage device 206c/300 for the stripe at issue, and the full strip of primary data stored by the primary data storage device 206d/300 for the stripe at issue, as indicated by the equation below:

Second intermediate parity data=XOR [STRIP$_{206c}$, STRIP$_{206d}$]

With reference to FIG. 9F, the storage engine 304 in the primary data storage device 206d/300 may then perform second intermediate parity data storage operations 906 that may include storing the second intermediate parity data in the CMB device 306 in the primary data storage device 206d/300.

As will be appreciated by one of skill in the art in possession of the present disclosure, the simplified example provided herein includes only two primary data storage devices that will not be written to as part of the data reconstruction write operation instructed as part of the write instruction received at block 502, and thus the second intermediate parity data may be generated via the XOR operation on the full strip of data for the stripe at issue from each of those data storage devices as described above. However, one of skill in the art in possession of the present disclosure will appreciate how the second intermediate parity data may be generated when additional primary data storage devices exist that will not be written to as part of the data reconstruction write operation.

For example, the secondary intermediate parity data generation operations may be generated by sequential XOR operations using the full strip of data for the stripe at issue that is stored on each of the primary data storage devices will not be written to as part of the data reconstruction write operation. To provide another simplified example in which there are more than two primary data storage devices will not be written to as part of the data reconstruction write operation, a first XOR operation may be performed on the full strip of data for the stripe at issue stored on first and second primary data storage devices (i.e., XOR [STRIP$_{1st}$, STRIP$_{2nd}$]), a second XOR operation may be performed on the result of the first XOR operation and the full strip of data for the stripe at issue stored on the third primary data storage device (i.e., XOR [STRIP$_{3rd}$, (XOR [STRIP$_{1st}$, STRIP$_{2nd}$])], and so on until the last XOR operation generates the second intermediate parity data.

In another example, the secondary intermediate parity data generation operations may be generated by parallel XOR operations using the full strip of data for the stripe at issue that is stored on each of the primary data storage devices will not be written to as part of the data reconstruction write operation. To provide another simplified example in which there are four primary data storage devices will not be written to as part of the data reconstruction write operation, a first XOR operation may be performed on the full strip of data for the stripe at issue stored on first and second primary data storage devices (i.e., XOR [STRIP$_{1st}$, STRIP$_{2nd}$]), a second XOR operation may be performed on the full strip of data for the stripe at issue stored on third and fourth primary data storage devices (i.e., XOR [STRIP$_{3rd}$, STRIP$_{4th}$]), and a third XOR operation may be performed on the results of the first and second XOR operations (i.e., XOR [(XOR [STRIP$_{1st}$, STRIP$_{2nd}$]), (XOR [STRIP$_{3rd}$, STRIP$_{4th}$])]) to generate the second intermediate parity data. One of skill in the art in possession of the present disclosure will appreciate how this parallel XOR operation example may be extended out to additional numbers of primary data storage devices, as well as how the sequential XOR operations and parallel XOR operations may be combined in order to generate the second intermediate parity data as well.

Figure 10A:
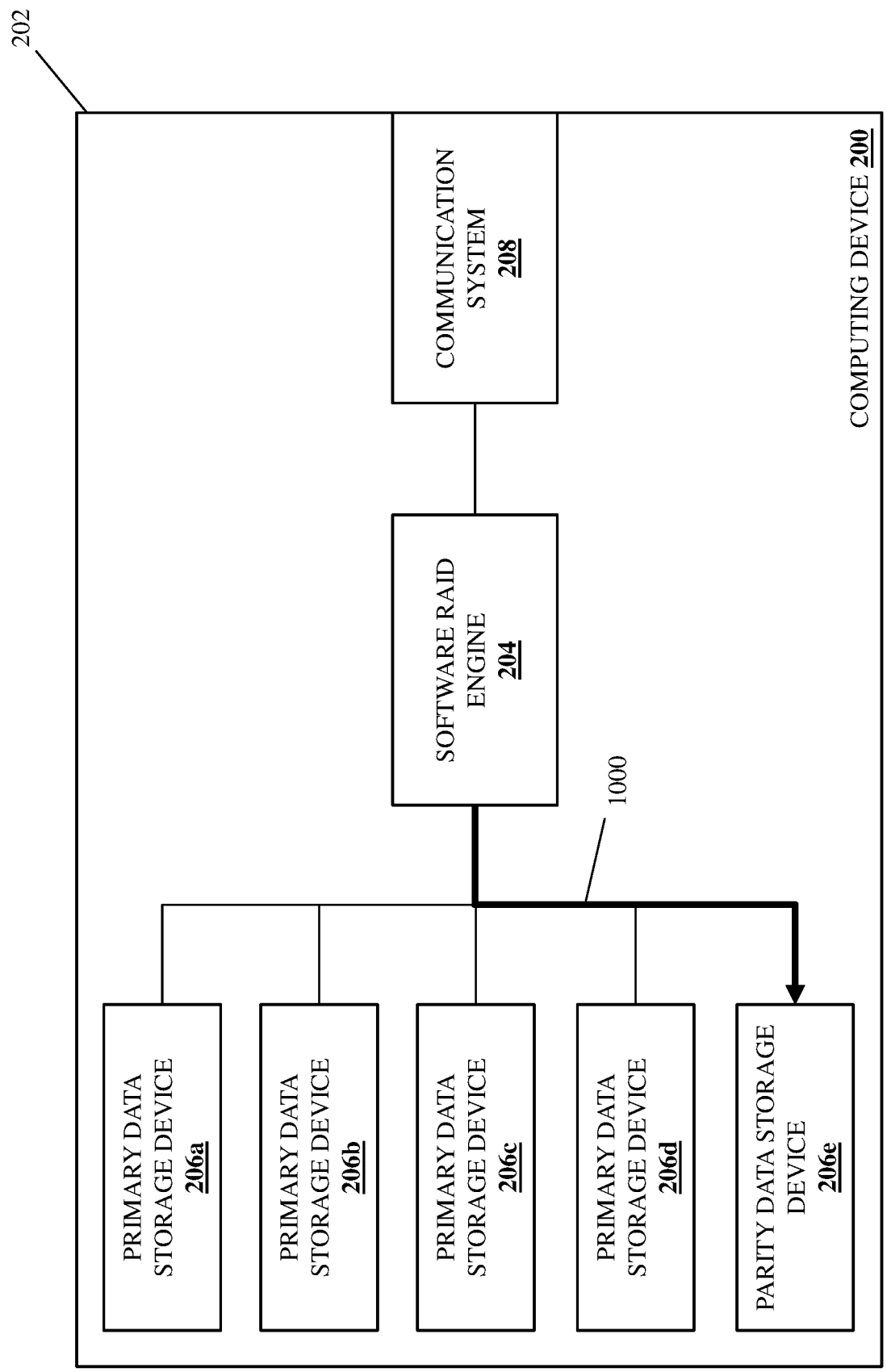
FIG. 10A is a schematic view illustrating an embodiment of the computing device of FIG. 4 operating during the method of FIG. 5.
Figure 10B:
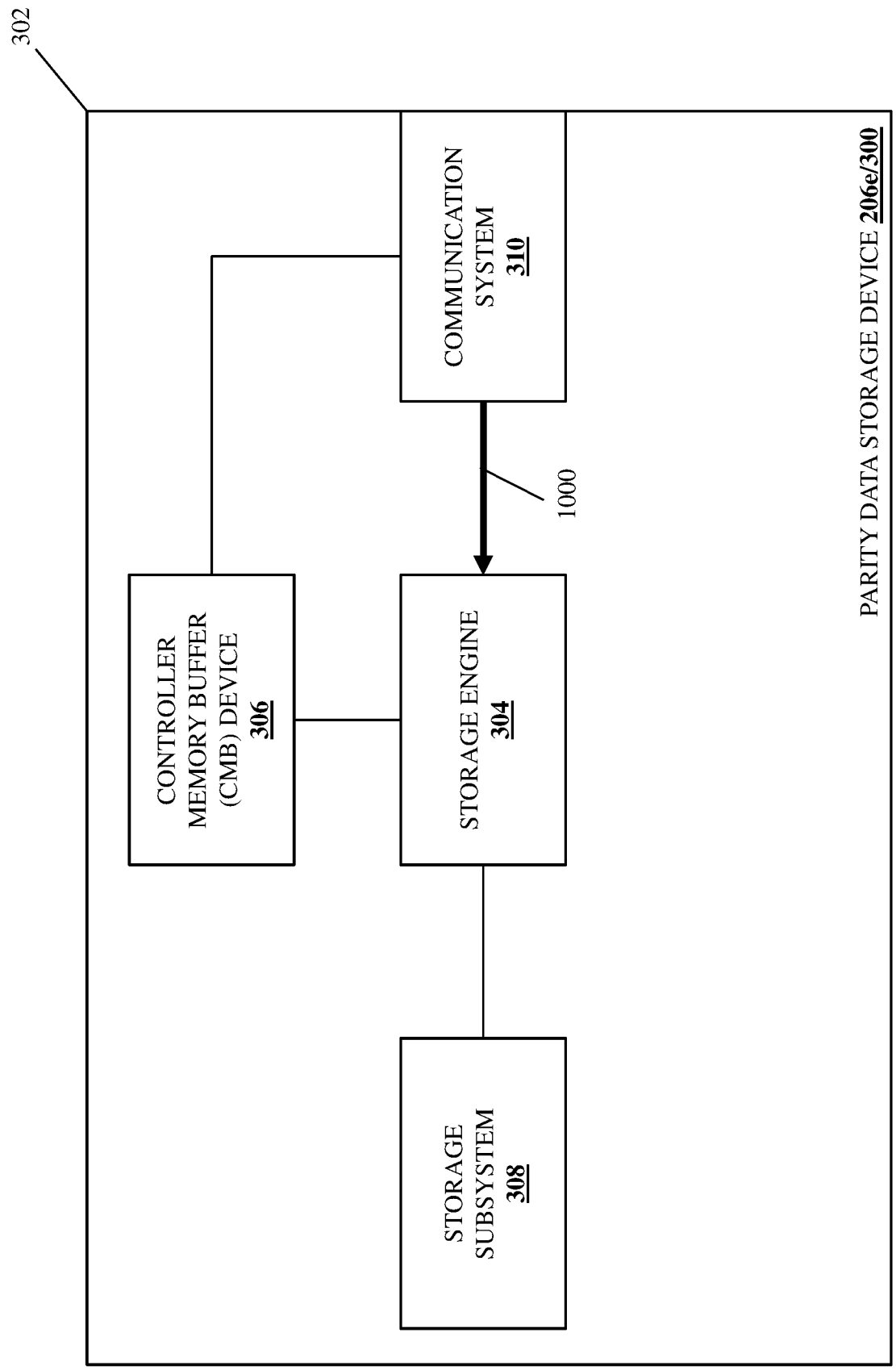
FIG. 10B is a schematic view illustrating an embodiment of the storage device of FIG. 3 operating during the method of FIG. 5.

The method 500 then proceeds to block 508 where the RAID subsystem causes the parity data storage device to generate final parity data using the first intermediate parity data in the parity data storage device and the second intermediate parity data in the first primary data storage device. With reference to FIGS. 10A and 10B, in an embodiment of block 508, the software RAID engine 204 in the computing device 200 may perform final parity data generation instruction operations 1000 that may include transmitting a final parity data generation instruction (e.g., via a vendor-specific command as described above that includes an XOR command along with addresses identifying the location of the intermediate parity data that is the subject of the XOR operation) to the storage engine 304 in the parity data storage device 206e via its communication subsystem 310.

Figure 10E:
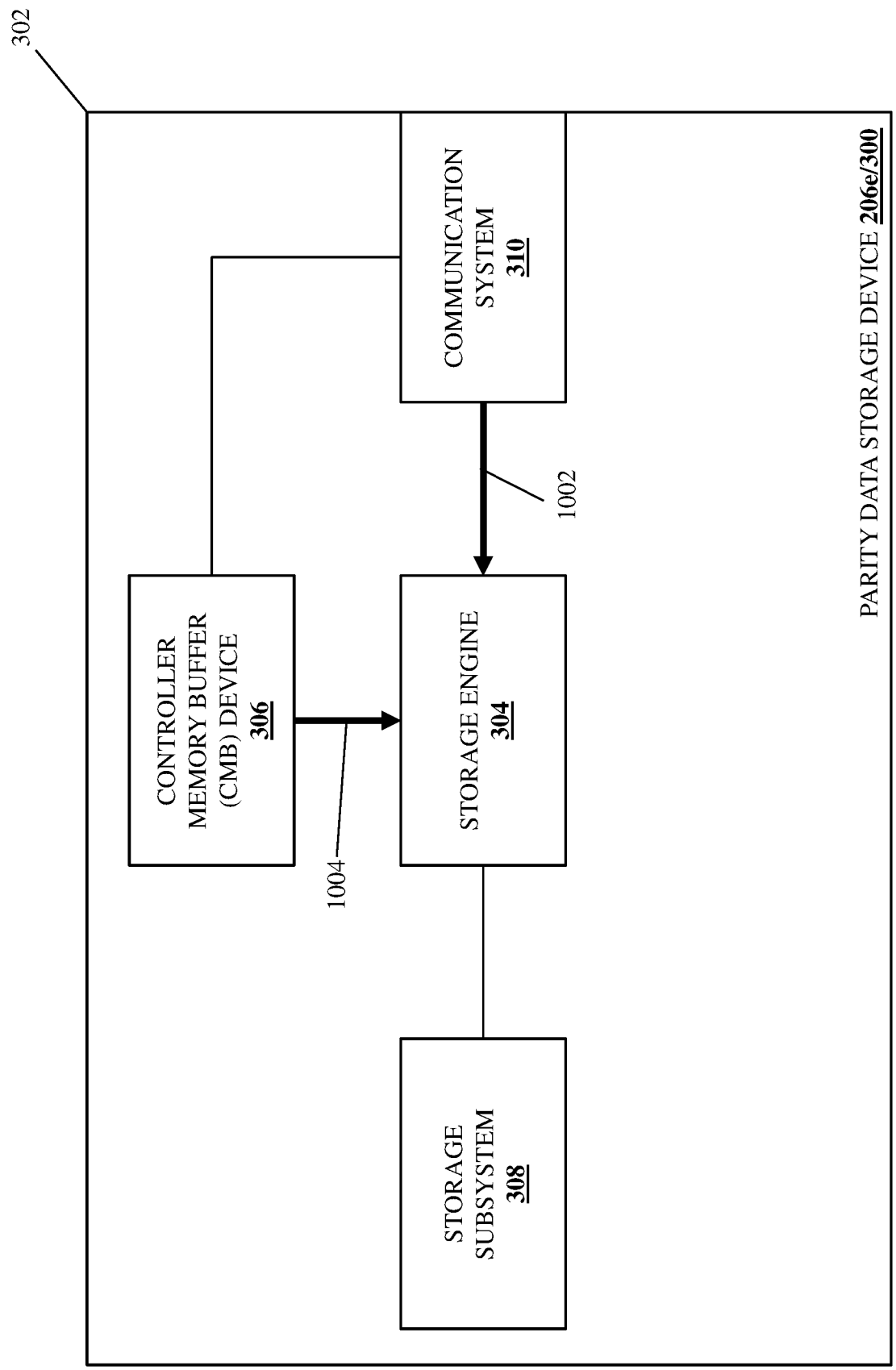
FIG. 10E is a schematic view illustrating an embodiment of the storage device of FIG. 3 operating during the method of FIG. 5.

With reference to FIGS. 10C, 10D, and 10E, at block 508 and in response to receiving the final parity data generation instruction, the storage engine 304 in the parity data storage device 206e/300 may perform second intermediate parity data retrieval operations 1002 that include retrieving the second intermediate parity data generated by the primary data storage device 206d/300 at block 506 from the CMB device 306 in the primary data storage device 206d/300 via the respective communication subsystems 310 in the parity data storage device 206e/300 and the primary data storage device 206d/300 (e.g., using the address for that second intermediate parity data included in the vendor-specific command discussed above). The storage engine 304 in the parity data storage device 206e/300 may then perform first intermediate parity data retrieval operations 1004 that include retrieving the first intermediate parity data generated and stored by the software RAID engine 204 in the CMB device 306 of the parity data storage device 206e/300 at block 504 (e.g., using the address for that first intermediate parity data included in the vendor-specific command discussed above).

The storage engine 304 in the parity data storage device 206e/300 may then perform final parity data generation operations that include using the first intermediate parity data and the second intermediate parity data to generate final parity data. For example, at block 508, the storage engine 304 in the parity data storage device 206e/300 may perform an XOR operation using the first intermediate parity data and the second intermediate parity data, as indicated by the equation below:

Final parity data=$XOR$ [$1^{st}$ intermediate parity data, $2^{nd}$ intermediate parity data]

Figure 10G:
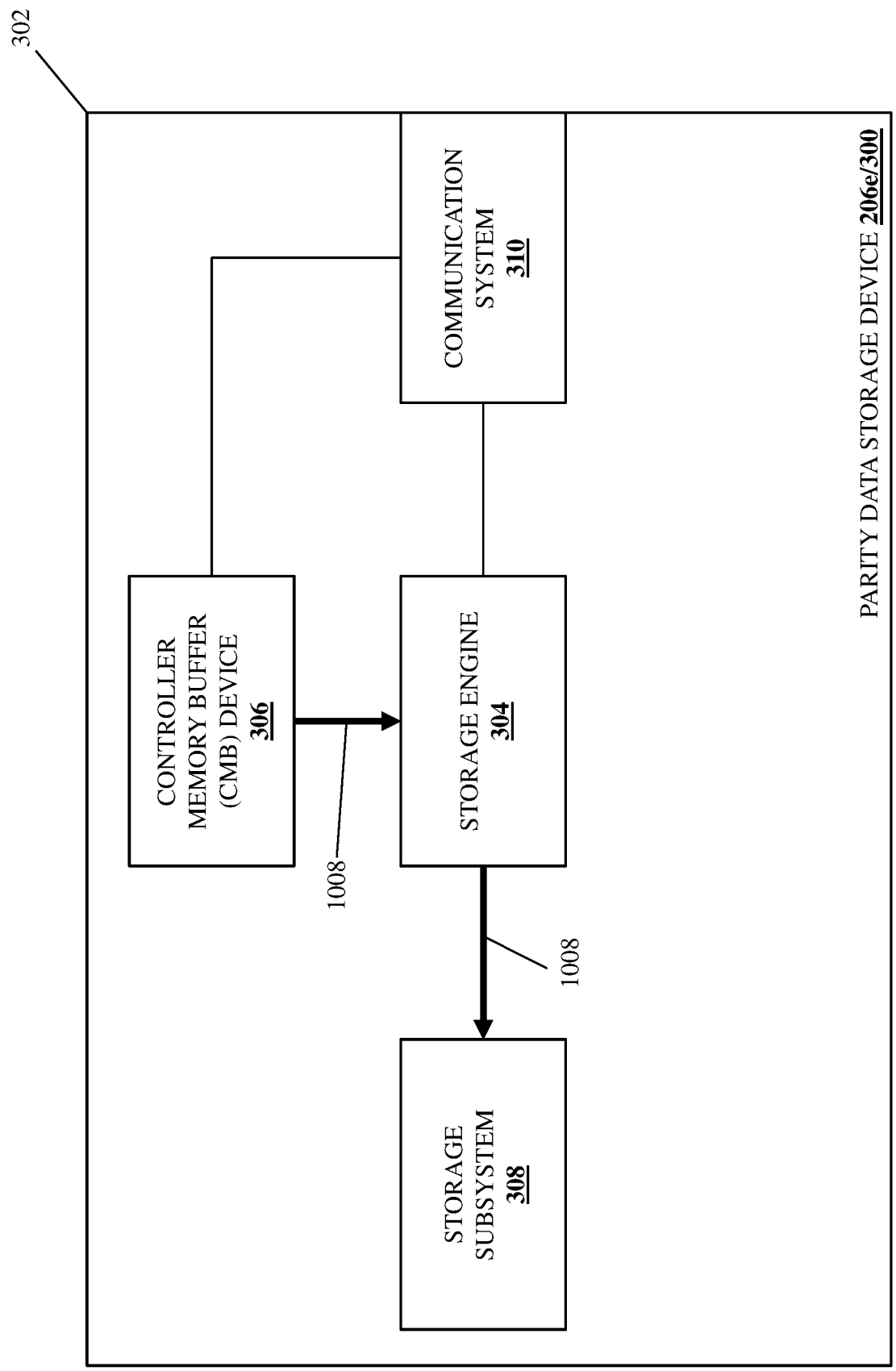
FIG. 10G is a schematic view illustrating an embodiment of the storage device of FIG. 3 operating during the method of FIG. 5.

With reference to FIG. 10F, the storage engine 304 in the parity data storage device 206e/300 may then perform final parity data storage operations 1006 that may include storing the final parity data in the CMB device 306 in the parity data storage device 206e/300. With reference to FIG. 10G, the storage engine 304 in the parity data storage device 206e/300 may then perform final parity data transfer operations 1008 that may include transferring the final parity data from the CMB device 306 in the parity data storage device 206e/300 to the storage subsystem 308 in the parity data storage device 206e/300.

Thus, systems and methods have been described that distribute the generation of parity data, when performing data reconstruction write operations with only full strip writes, between a software RAID engine and storage device(s) that will store that parity data along with the primary data from which it was generated. For example, the RAID distributed parity generation system of the present disclosure may include a chassis housing a RAID subsystem coupled to storage devices. The RAID subsystem receives a write instruction including new primary data for a subset of the storage devices that it uses to generate first intermediate parity data that it provides in a parity data storage device. The RAID engine then causes a first primary data storage device that is not in the subset to generate second intermediate parity data using its first primary data and respective second primary data in second primary data storage device(s) that are not in the subset, and provide the second intermediate parity data in the first primary data storage device. The RAID subsystem then causes the parity data storage device to generate final parity data using the first intermediate parity data and the second intermediate parity data. As such, the processing required by the software RAID engine to generate parity data when performing data reconstruction write operations with only full strip writes is reduced, allowing its processing system to be utilized for other software RAID operations.

Figure 11:
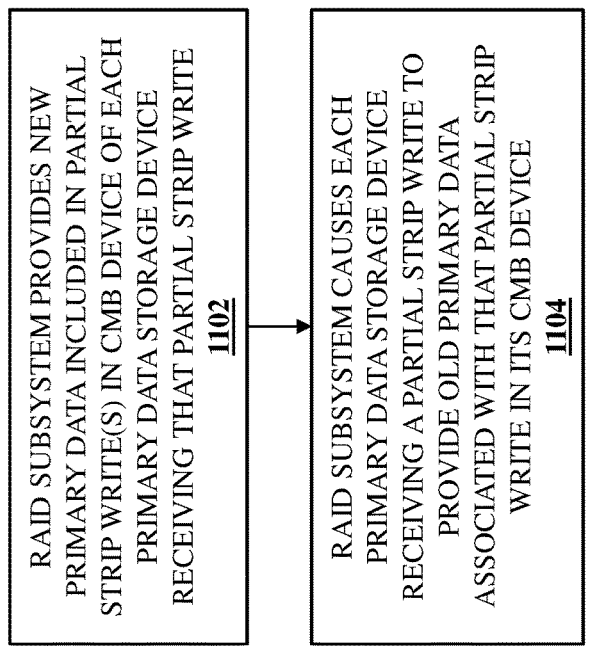
FIG. 11 is a flow chart illustrating an embodiment of a method for distributing RAID parity generation.

Referring now to FIG. 11, an embodiment of a method 1100 for distributing Redundant Array of Independent Disk (RAID) parity generation is illustrated. As discussed above, the method 500 provides an example of the teachings of the present disclosure applied to a data reconstruction write operation to write new primary data as full strip writes to each of a subset of primary data storage devices. However, one of skill in the art in possession of the present disclosure will appreciate how data reconstruction write operations may provide for the writing of new primary data as full strip writes to some of the subset of primary data storage devices, and partial strip writes to others of the subset of primary data storage devices. In such mixed full strip write/partial strip write data reconstruction write operations, blocks 502, 504, and 508 of the method 500 may operate the same as described above, but with the method 1100 performed between blocks 504 and 506, and block 506 modified slightly as described below.

In the specific examples provided for the discussion of the method 1100 below, the write instruction received at block 502 of the method 500 includes "new" primary data (i.e., that will replace "old" primary data), and instructs a data reconstruction write operation to write the new primary data to the primary data storage devices 206a, 206b, and 206c (i.e., the subset of primary data storage devices 206a-206d). Furthermore, the writing of that new primary data in the specific examples provided for the discussion of the method 1100 below include "full strip" writes to each of the primary data storage devices 206a and 206b (i.e., all of the portion of the data (i.e., the strip) provided by each of the primary data storage devices 206a and 206b for the stripe at issue will be written), and a "partial strip" write to the primary data storage device 206c (i.e., only a subset of the portion of the data (i.e., the strip) provided by the primary data storage device 206c for the stripe at issue will be written). However, while only a single primary data storage device is described below as receiving a partial strip write during the methods 500 and 1100, one of skill in the art in possession of the present disclosure will appreciate how the methods 500 and 1100 may be applied to additional storage devices receiving partial strip writes while remaining within the scope of the present disclosure as well.

As such, block 504 of the method 500 may be performed substantially as described above, with the software RAID engine 504 generating the first intermediate parity data by performing the XOR operation using the first portion of the new primary data that will be provided for storage on the primary data storage device 206a (i.e., as part of the full strip write to that primary data storage device 206a as discussed above) and the second portion of the new primary data that will be provided for storage on the primary data storage device 206b (i.e., as part of the full strip write to that primary data storage device 206b as discussed above), and storing the first intermediate parity data in the CMB device 306 in the parity data storage device 206e/300.

Figure 12A:
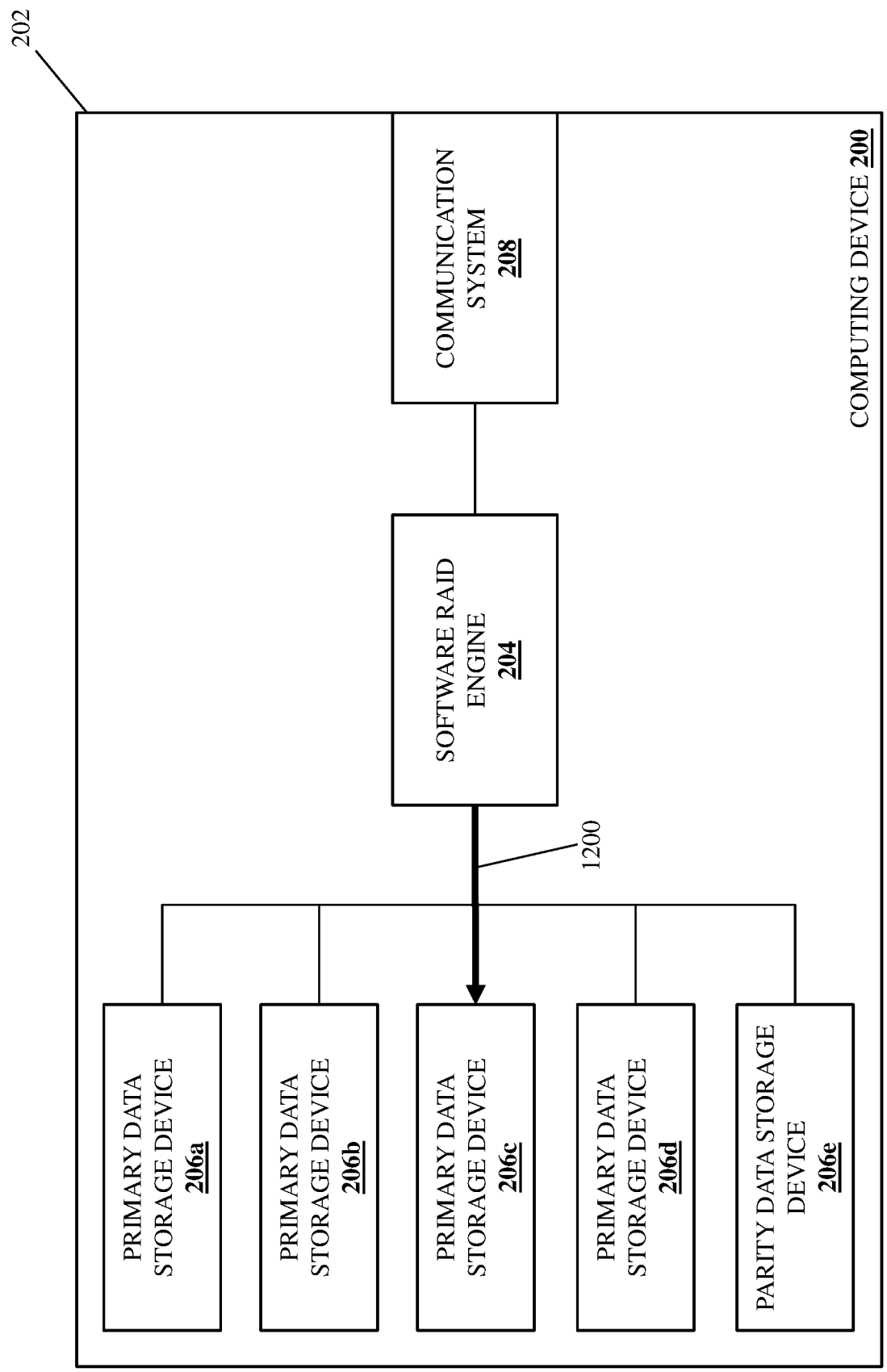
FIG. 12A is a schematic view illustrating an embodiment of the computing device of FIG. 4 operating during the method of FIG. 5.
Figure 12B:
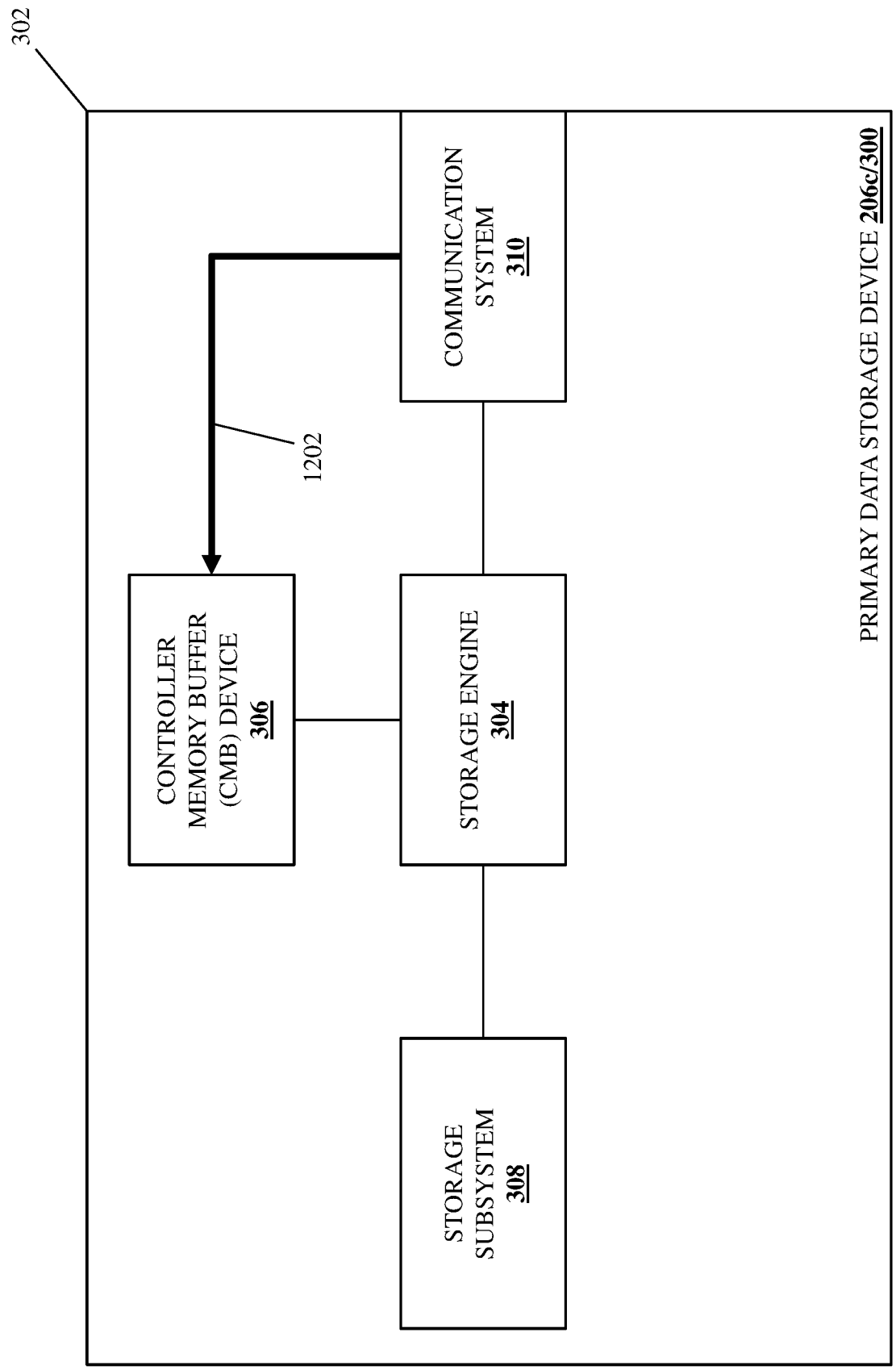
FIG. 12B is a schematic view illustrating an embodiment of the storage device of FIG. 3 operating during the method of FIG. 5.

The method 1100 begins at block 1102 where the RAID subsystem provides new primary data included in at least one partial strip write in the CMB device of each primary data storage device that is receiving that partial strip write. With reference to FIGS. 12A and 12B, in an embodiment of block 1102, the software RAID engine 204 may perform partial strip new primary data storage operations 1200 that include storing new primary data that is included in the partial strip write for the primary data storage device 206c/300 (e.g., the new primary data for the portion of the strip for the stripe at issue) in the CMB device 306 of the primary data storage device 206c/300 via its communication system 310.

Figure 13A:
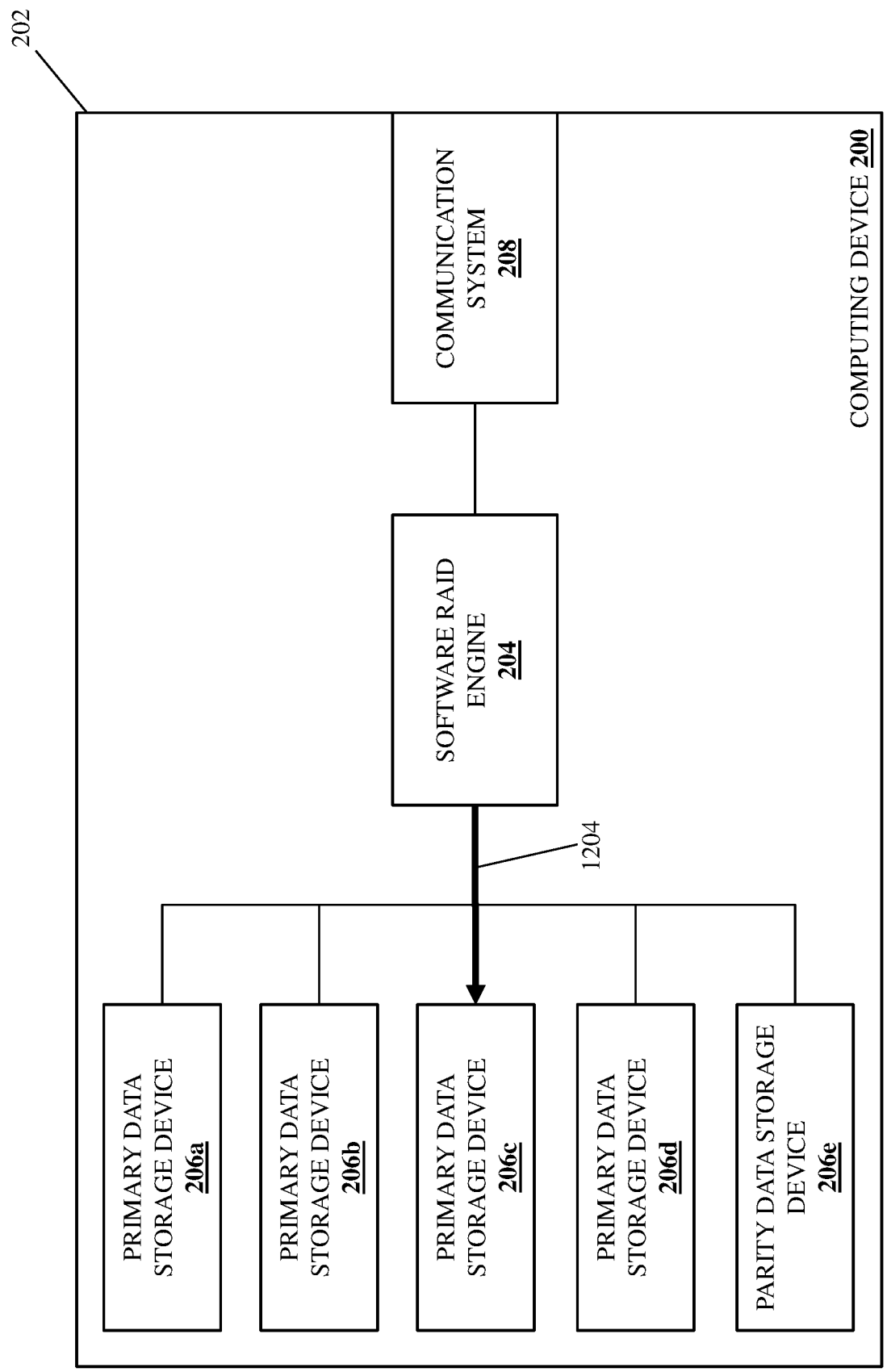
FIG. 13A is a schematic view illustrating an embodiment of the computing device of FIG. 4 operating during the method of FIG. 5.
Figure 13B:
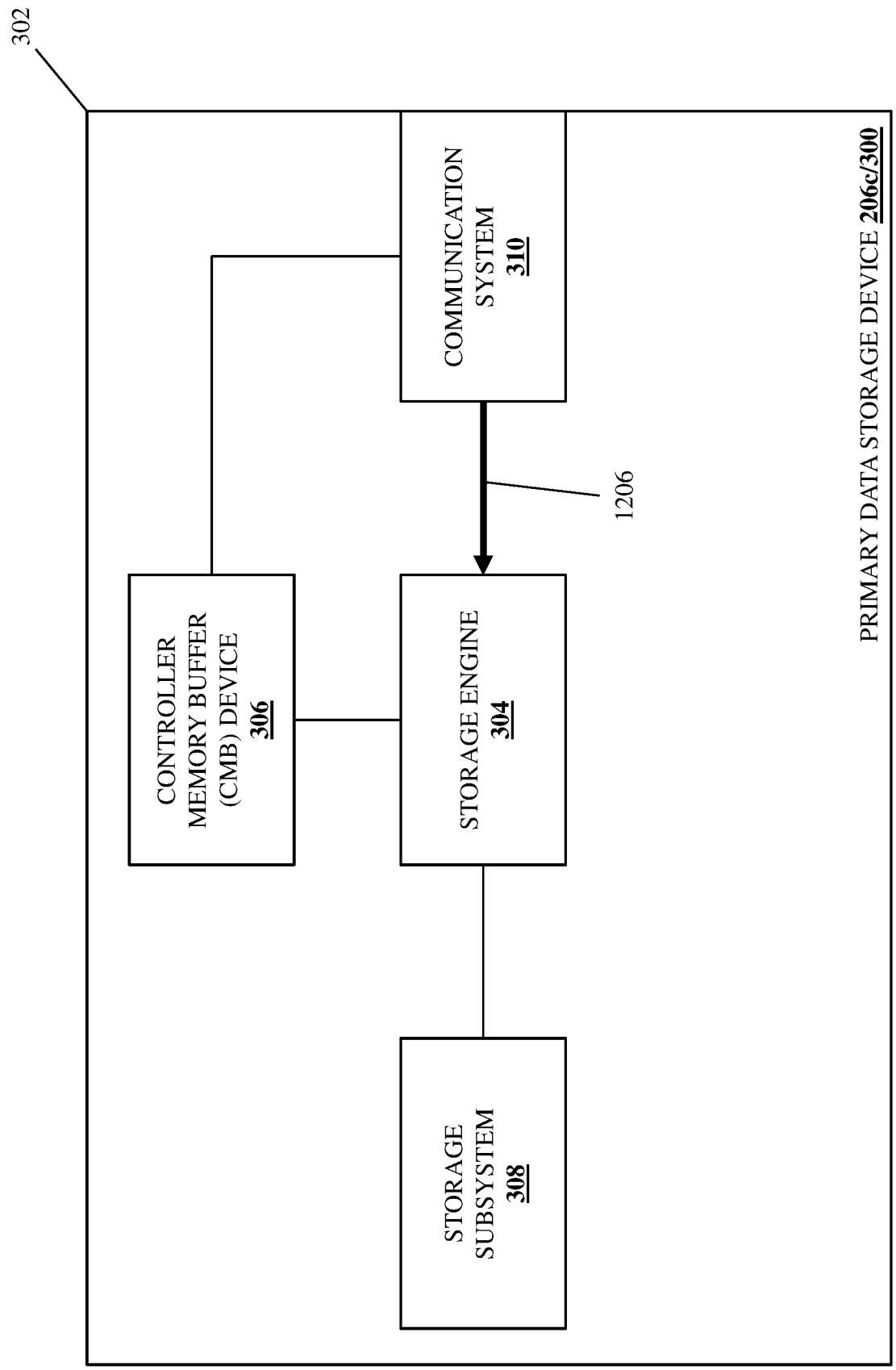
FIG. 13B is a schematic view illustrating an embodiment of the storage device of FIG. 3 operating during the method of FIG. 5.
Figure 13C:
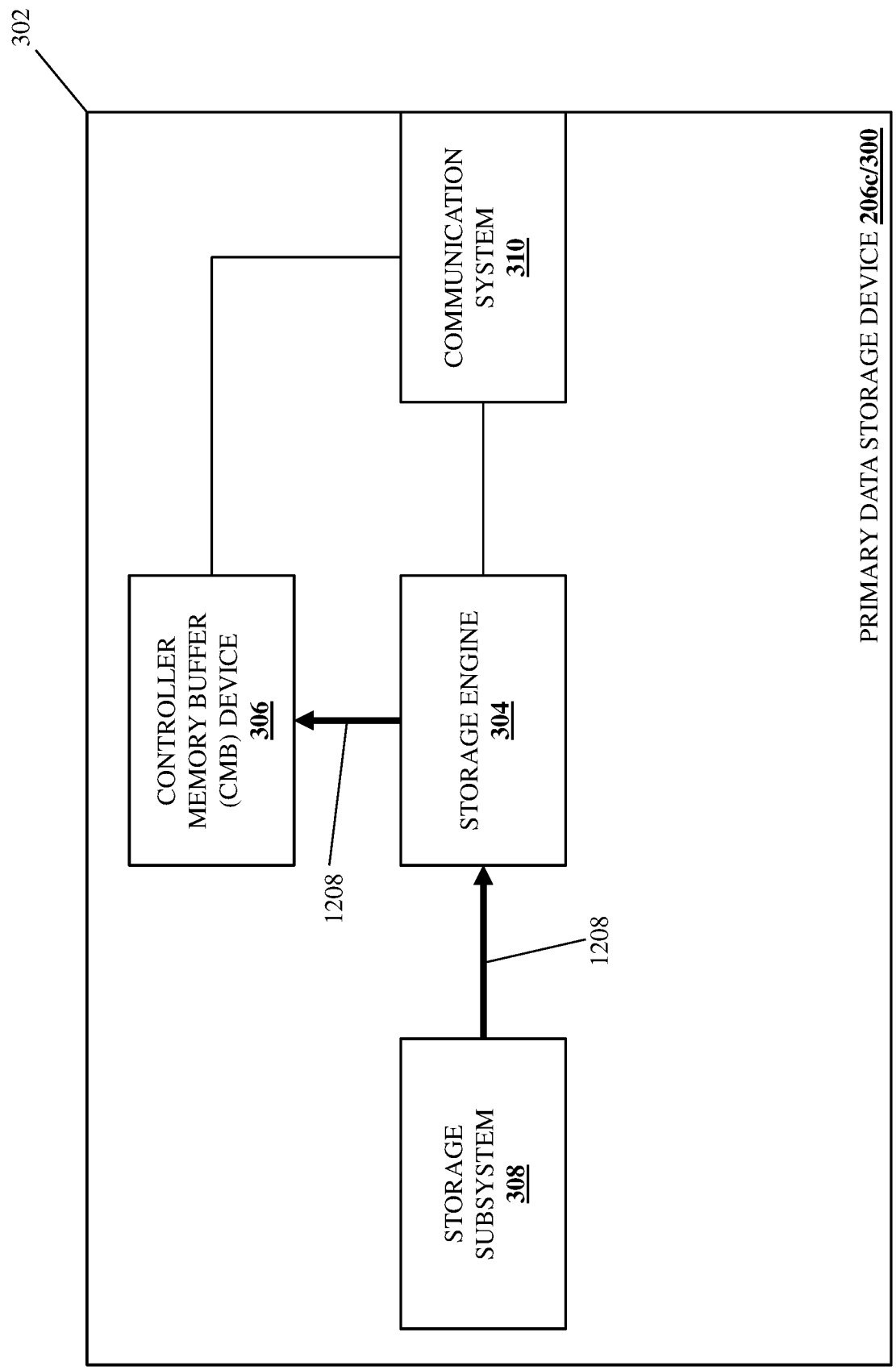
FIG. 13C is a schematic view illustrating an embodiment of the storage device of FIG. 3 operating during the method of FIG. 5.

The method 1100 then proceeds to block 1104 where the RAID subsystem causes each primary storage device receiving a partial strip write to provide old primary data associated with that partial strip write in its CMB device. With reference to FIGS. 13A and 13B, in an embodiment of block 1104, the software RAID engine 204 may perform partial strip old primary data transfer instruction operations 1204 that include transmitting a partial strip old primary data transfer instruction to transfer the old primary data associated with in its partial strip write (e.g., the old primary data that will not be changing in the portion of the strip for the stripe at issue in response to the partial strip write) to the storage engine 304 in the primary data storage device 206c/300 via its communication system 310. With reference to FIG. 13C, in an embodiment of block 1104 and in response to receiving the partial strip old primary data transfer instruction, the storage engine 304 in the primary data storage device 206c/300 will perform old primary data transfer operations 1208 that include transferring old primary data that is associated with the partial strip write (e.g., the old primary data that will not be changing in the portion of the strip for the stripe at issue in response to the partial strip write) from the storage subsystem 308 in the primary data storage device 206c/300 to the CMB device 306 in the primary data storage device 206c/300.

As such, following block 1104, the CMB device 306 in the primary data storage device 206c that will receive the partial strip write as part of the data construction write operations will have a full strip of data in its CMB device 306 that includes the new primary data that provides the partial write of the strip, and the old primary data that provides the remainder of that strip that will not change in response to the partial write of the strip. Block 506 of the method 500 may then proceed substantially as described above, but with the exception that the storage engine 304 in the primary data storage device 206d/300 will generate the second intermediate parity data using the primary data provided in the CMB device 306 of the primary data storage device 206c/300 as per the method 1100. In other words, the storage engine 304 in the primary data storage device 206d/300 may perform an XOR operation using the full strip of primary data stored by the primary data storage device 206d/300 for the stripe at issue, and the mixture of new primary data (that provides the partial strip write) and old primary data (that will not change in response to the partial strip write) associated with the primary data storage device 206c/300 for the stripe at issue. Furthermore, one of skill in the art in possession of the present disclosure will appreciate how the partial strip operations performed according to the method 1100 may allow the sequential and/or parallel XOR operations by larger numbers of primary data storage devices (either not receiving new primary data or only receiving new primary data as part of a partial strip write) while remaining with the scope of the present disclosure as well.

Block 508 of the method 500 may then be performed the same as described above, with the storage engine 304 in the parity data storage device 206e/300 using the first intermediate parity data generated and provided in its CMB device 306 by the software RAID engine 204, and the second intermediate parity data stored in the CMB device 306 of the primary data storage device 206d/300, in order to generate the final parity data and store that final parity data in its storage subsystem 308.

Thus, systems and methods have been described that distribute the generation of parity data, when performing data reconstruction write operations with both full strip writes and partial strip writes, between a software RAID engine and storage device(s) that will store that parity data along with the primary data from which it was generated. This is accomplished by modifying the full-strip-write-only data reconstruction write operation embodiments described above such that the software RAID subsystem provides new primary data included in partial strip write(s) in each primary data storage device receiving that partial strip write, and causes each primary data storage device receiving a partial strip write to provide access to old primary data included in that partial strip write, and use that combined new/old primary data associated with the partial strip write to generate the second intermediate parity data. As such, the processing required by the software RAID engine to generate parity data when performing data reconstruction write operations with both full strip writes and partial strip writes is reduced, allowing its processing system to be utilized for other software RAID operations.

Figure 14:
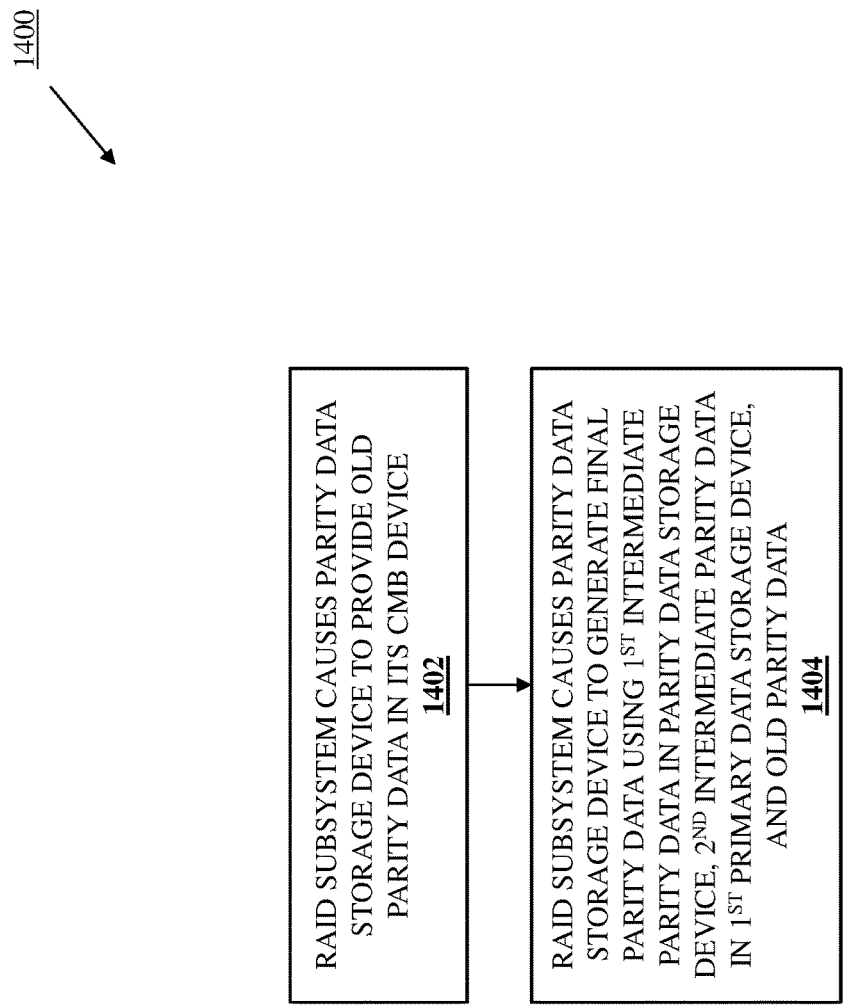
FIG. 14 is a flow chart illustrating an embodiment of a method for distributing RAID parity generation.

Referring now to FIG. 14, an embodiment of a method 1400 for distributing Redundant Array of Independent Disk (RAID) parity generation is illustrated. As discussed above, the method 500 provides an example of the teachings of the present disclosure applied to a data reconstruction write operation to write new primary data as full strip writes to each of a subset of primary data storage devices, while the method 1100 provides an example of the teachings of the present disclosure applied to a data reconstruction write operation to write new primary data as a mix of full strip writes and partial strip writes to a subset of primary data storage devices. However, one of skill in the art in possession of the present disclosure will appreciate how Read Modify Write (RMW) operations may also provide for the writing of new primary data as full strip writes to some of the subset of primary data storage devices, and partial strip writes to others of the subset of primary data storage devices. In such mixed full strip write/partial strip write RMW operations, the combined methods 500 and 1100 (e.g., block 502, followed by block 504, followed by the method 1100, followed by the modified block 506, followed by block 508) may operate the same as described above, but with block 508 replaced with the method 1400.

In the specific examples provided for the discussion of the method 1100 below, the write instruction received at block 502 of the method 500 includes "new" primary data (i.e., that will replace "old" primary data), and instructs a RMW operation to write the new primary data to the primary data storage devices 206a, 206b, and 206c (i.e., the subset of primary data storage devices 206a-206d). Furthermore, the writing of that new primary data in the specific examples provided for the discussion of the method 500 below include "full strip" writes to each of the primary data storage devices 206a and 206b (i.e., all of the portion of the data (i.e., the strip) provided by each of the primary data storage devices 206a and 206b for the stripe at issue will be written), and a "partial strip" write to the primary data storage device 206c (i.e., only a subset of the portion of the data (i.e., the strip) provided by the primary data storage device 206c for the stripe at issue will be written). As will be appreciated by one of skill in the art in possession of the present disclosure, while the simplified example provided for the discussion of the method 500 involves the writing of over half of the stripe provided by the primary data storage devices 206a-206d, RMW operations are typically performed when less than half of the stripe is being written to, and thus may be applied to such situations while remaining within the scope of the present disclosure.

As such, the combined methods 500 and 1100 may proceed as described above for block 502, followed by block 504, followed by the method 1100, followed by modified block 506. As discussed above, following modified block 506, the CMB device 306 of the parity data storage device 206e/300 will store the first intermediate parity data generated from the new primary data that will be written in full strip writes on the primary data storage devices 206a and 206b, and the CMB device 306 in the primary data storage device 206d/300 will store the second intermediate parity data that was generated using the old primary data from the parity data storage device 206*d* and the combined new parity data/old parity data from the primary data storage device 206*c*.

Figure 15A:
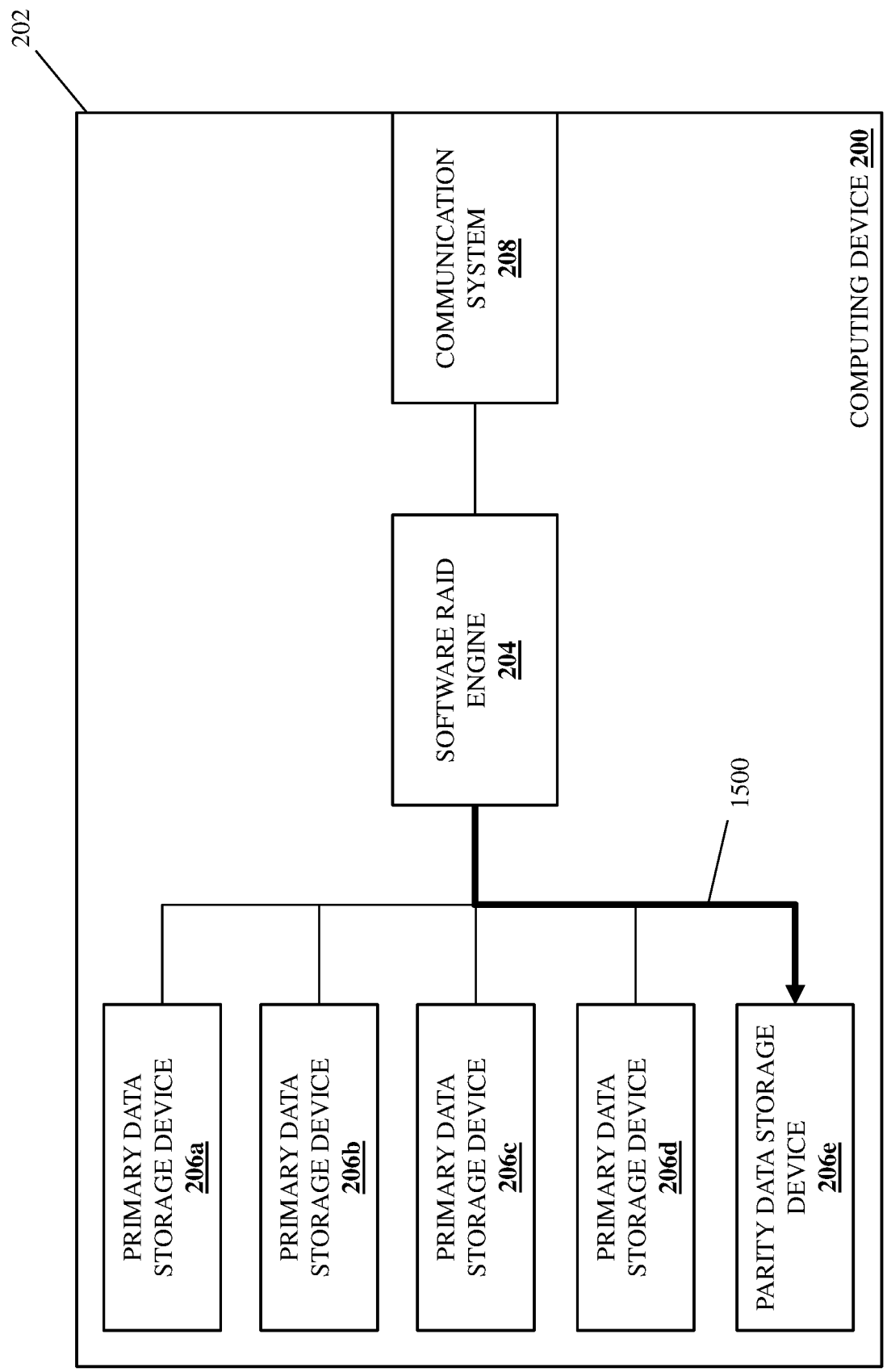
FIG. 15A is a schematic view illustrating an embodiment of the computing device of FIG. 4 operating during the method of FIG. 5.
Figure 15B:
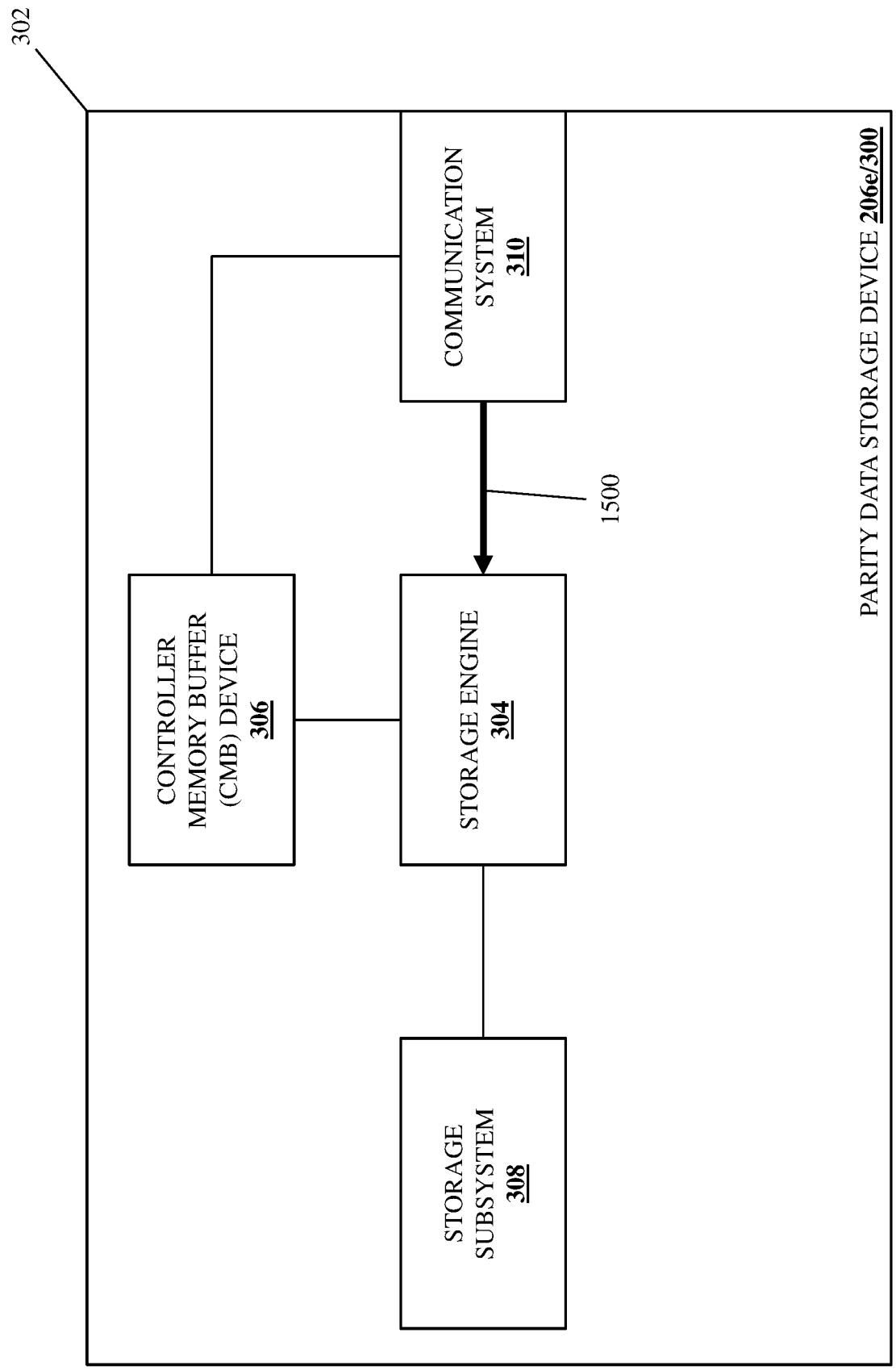
FIG. 15B is a schematic view illustrating an embodiment of the storage device of FIG. 3 operating during the method of FIG. 5.
Figure 15C:
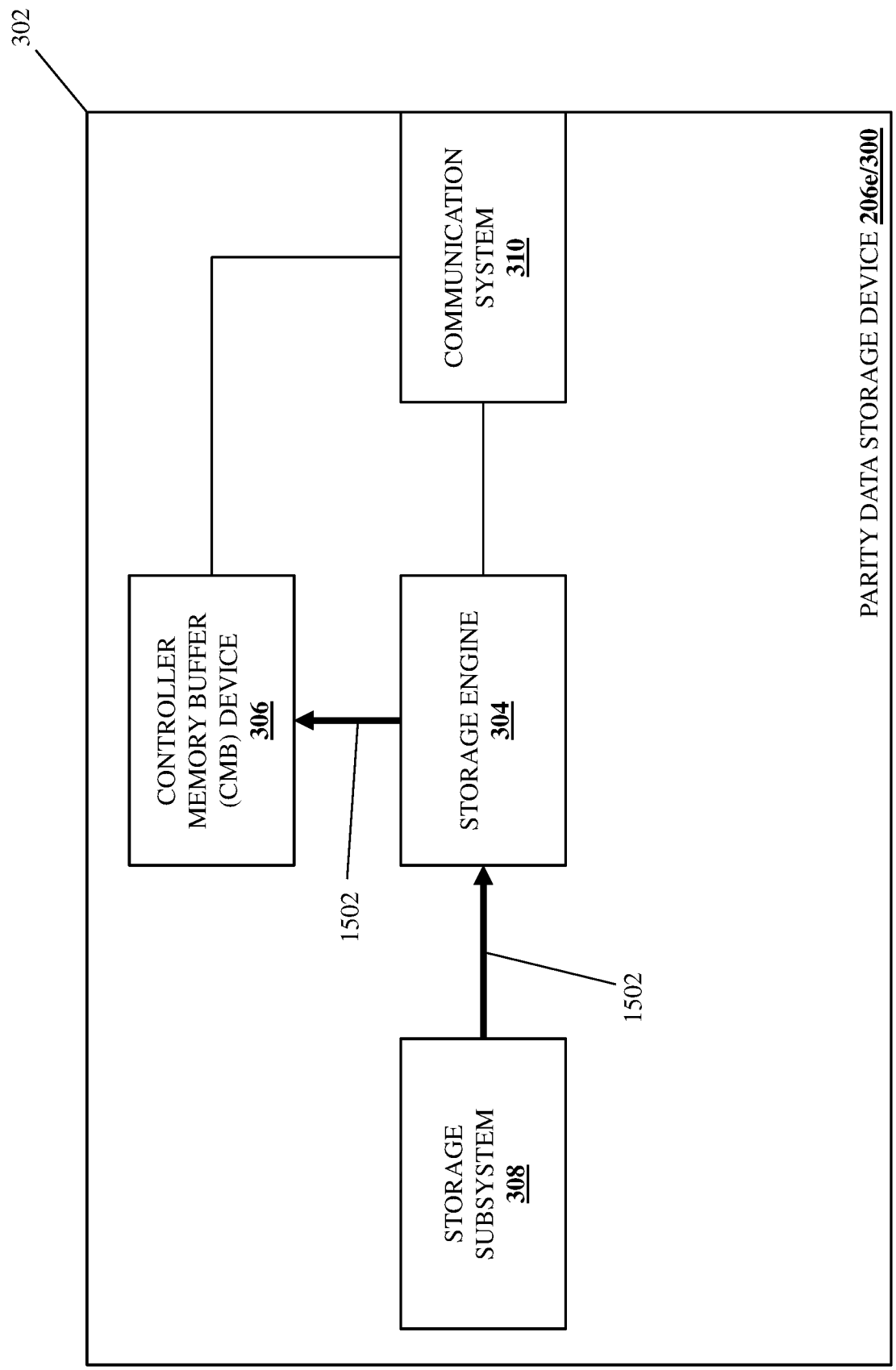
FIG. 15C is a schematic view illustrating an embodiment of the storage device of FIG. 3 operating during the method of FIG. 5.

Following modified block 506, the method 1400 begins at block 1402 where the RAID subsystem causes the parity data storage device to provide old parity data in its CMB device. With reference to FIGS. 15A and 15B, in an embodiment of block 1402, the software RAID engine 204 in the computing device 200 may perform old parity data transfer instruction operations 1500 that may include transmitting an old parity data transfer instruction (e.g., via a vendor-specific command as described above) to the storage engine 304 in the parity data storage device 206*e*/300 via its communication subsystem 310. With reference to FIG. 15C, at block 1402 and in response to receiving the old parity data transfer instruction, the storage engine 304 in the parity data storage device 206*e*/300 will perform old parity data transfer operations 1502, with the parity data storage device 206*e*/300 transferring its old parity data for the stripe at issue from its storage subsystem 308 to its CMB device 306.

Figure 16A:
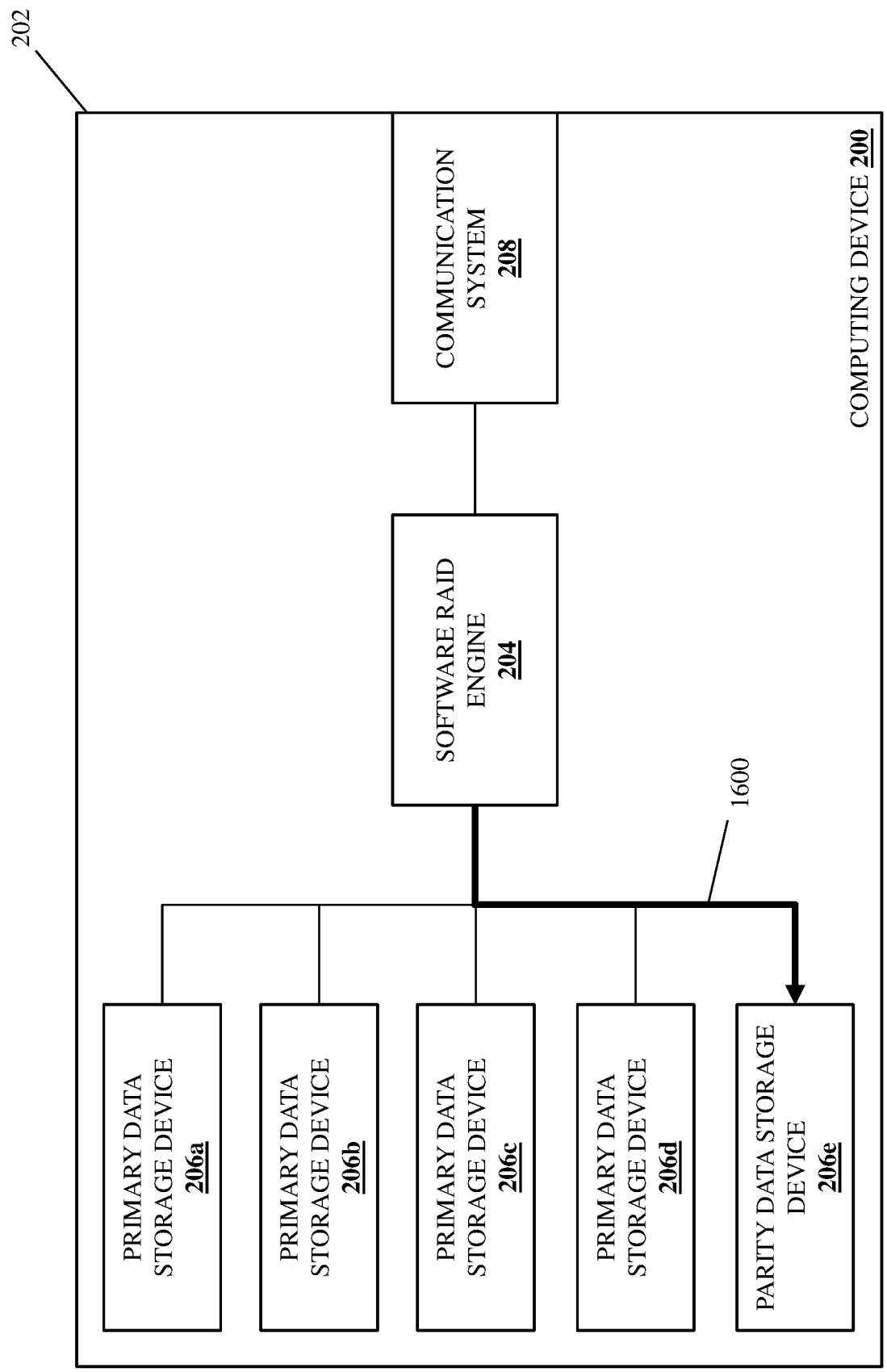
FIG. 16A is a schematic view illustrating an embodiment of the computing device of FIG. 4 operating during the method of FIG. 5.
Figure 16B:
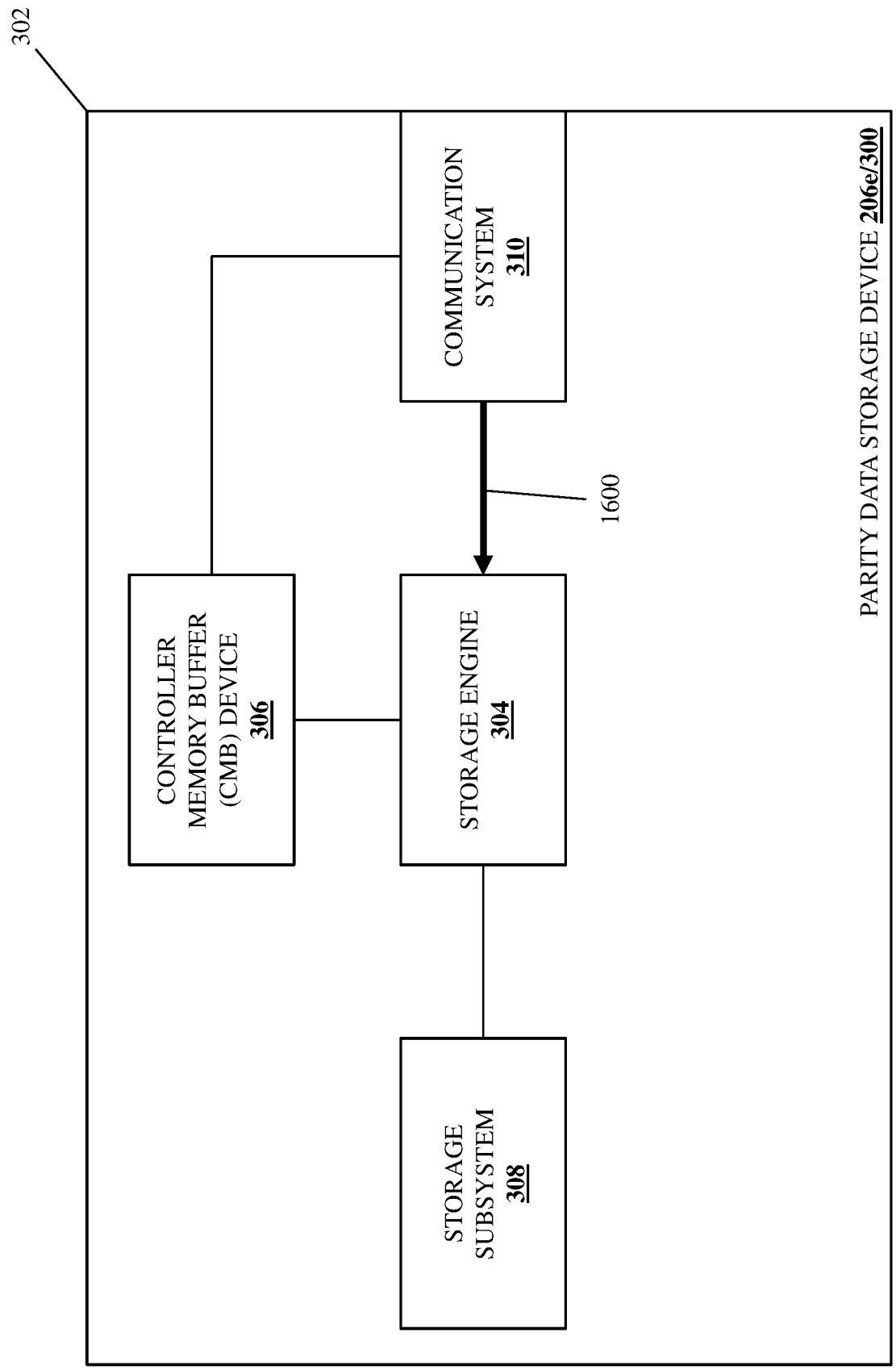
FIG. 16B is a schematic view illustrating an embodiment of the storage device of FIG. 3 operating during the method of FIG. 5.
Figure 16C:
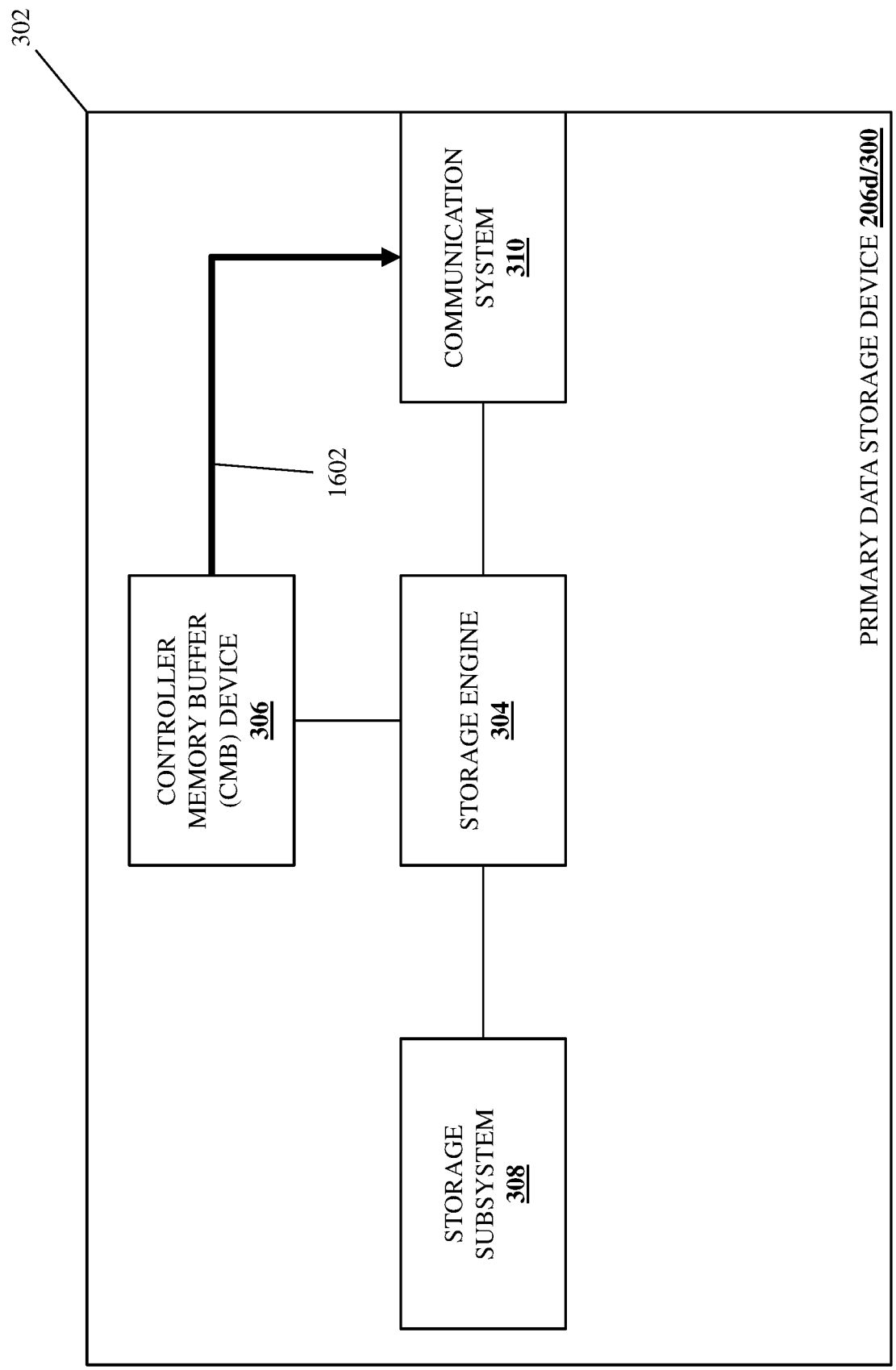
FIG. 16C is a schematic view illustrating an embodiment of the storage device of FIG. 3 operating during the method of FIG. 5.
Figure 16D:
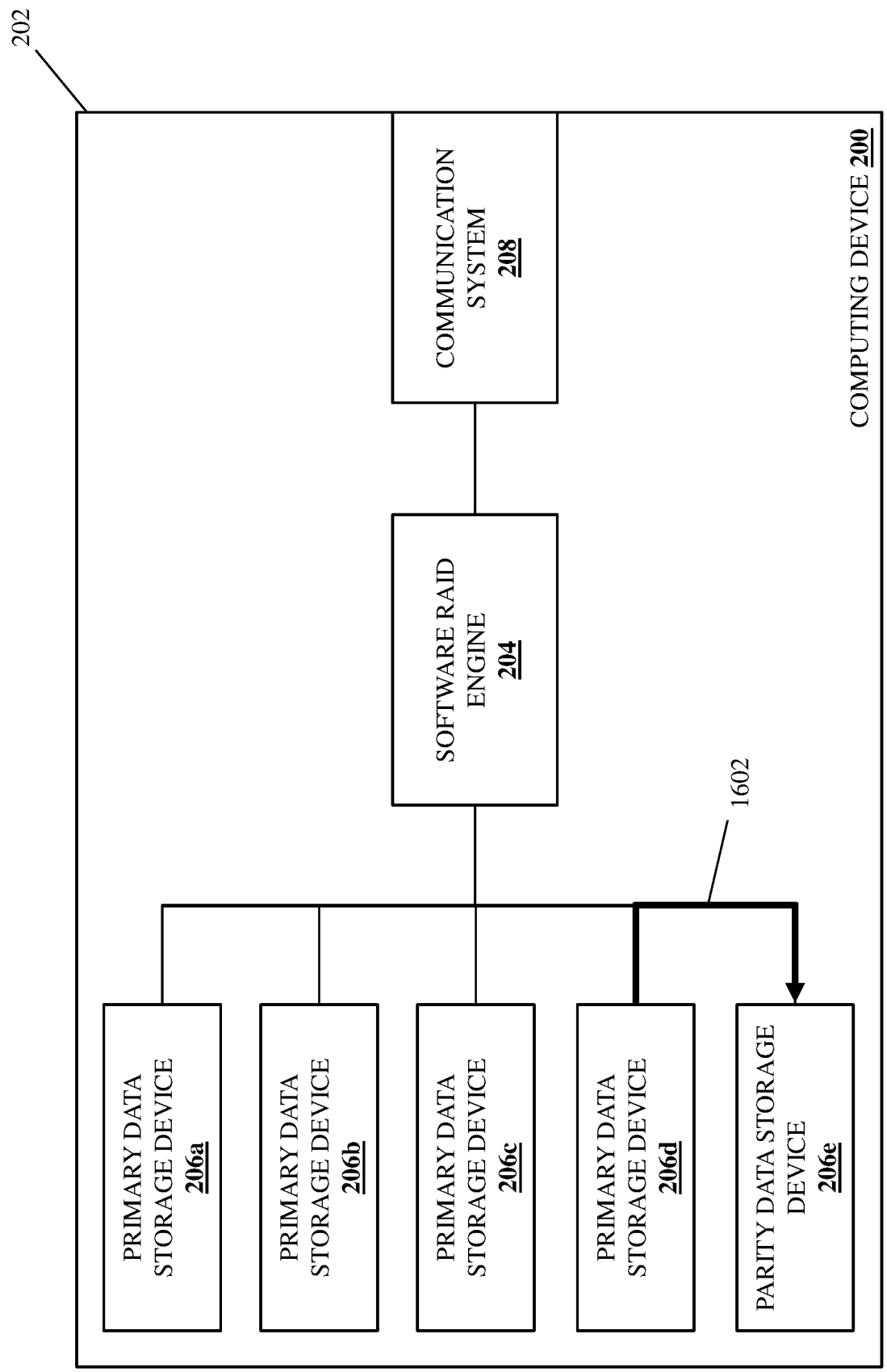
FIG. 16D is a schematic view illustrating an embodiment of the computing device of FIG. 4 operating during the method of FIG. 5.
Figure 16E:
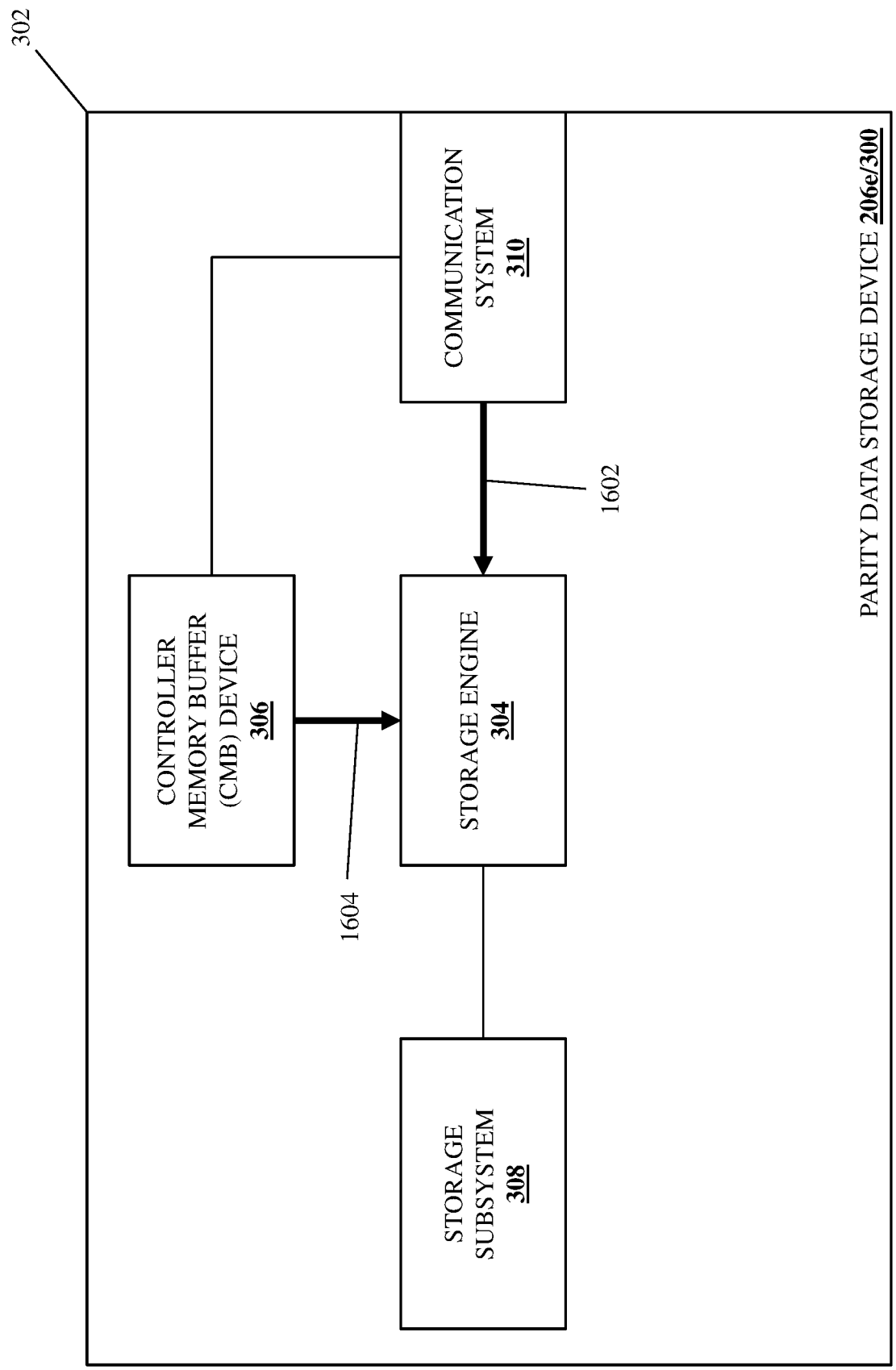
FIG. 16E is a schematic view illustrating an embodiment of the storage device of FIG. 3 operating during the method of FIG. 5.

The method 1400 then proceeds to block 1404 where the RAID subsystem causes the parity data storage device to generate final parity data using the first intermediate parity data in the parity data storage device, the second intermediate parity data in the first primary data storage device, and the old parity data. With reference to FIGS. 16A and 16B, in an embodiment, at block 1404, the software RAID engine 204 in the computing device 200 may perform final parity data generation instruction operations 1600 that may include transmitting a final parity data generation instruction (e.g., via a vendor-specific command as described above that includes an XOR command along with addresses identifying the location of the intermediate parity data and old parity data that is the subject of the XOR operation) to the storage engine 304 in the parity data storage device 206*e*/300 via its communication subsystem 310. With reference to FIGS. 16C, 16D, and 16E, at block 1404 and in response to receiving the final parity data generation instruction, the storage engine 304 in the parity data storage device 206*e*/300 will perform second intermediate parity data retrieval operations 1602 that include retrieving the second intermediate parity data from the CMB device 306 in the primary data storage device 206*d*/300 via their respective communication systems 310 (e.g., using the address for that second intermediate parity data included in the vendor-specific command discussed above).

The storage engine 304 in the parity data storage device 206*e*/300 will then perform final parity data generation operations 1604 that include retrieving the first intermediate parity data and the old parity data from its CMB device 306 (e.g., using the addresses for that first intermediate parity data and old parity data included in the vendor-specific command discussed above), and using the first intermediate parity data, the second intermediate parity data, and the old parity data to generate new parity data. For example, at block 1404, the storage engine 304 in the parity data storage device 206*e*/300 may generate the final parity data by performing an XOR operation using the first intermediate parity data, the second intermediate parity data, and the old parity data, as indicated by the equation below:

Final parity data=XOR [$1^{st}$ intermediate parity data, $2^{nd}$ intermediate parity data, old parity data]

Figure 16F:
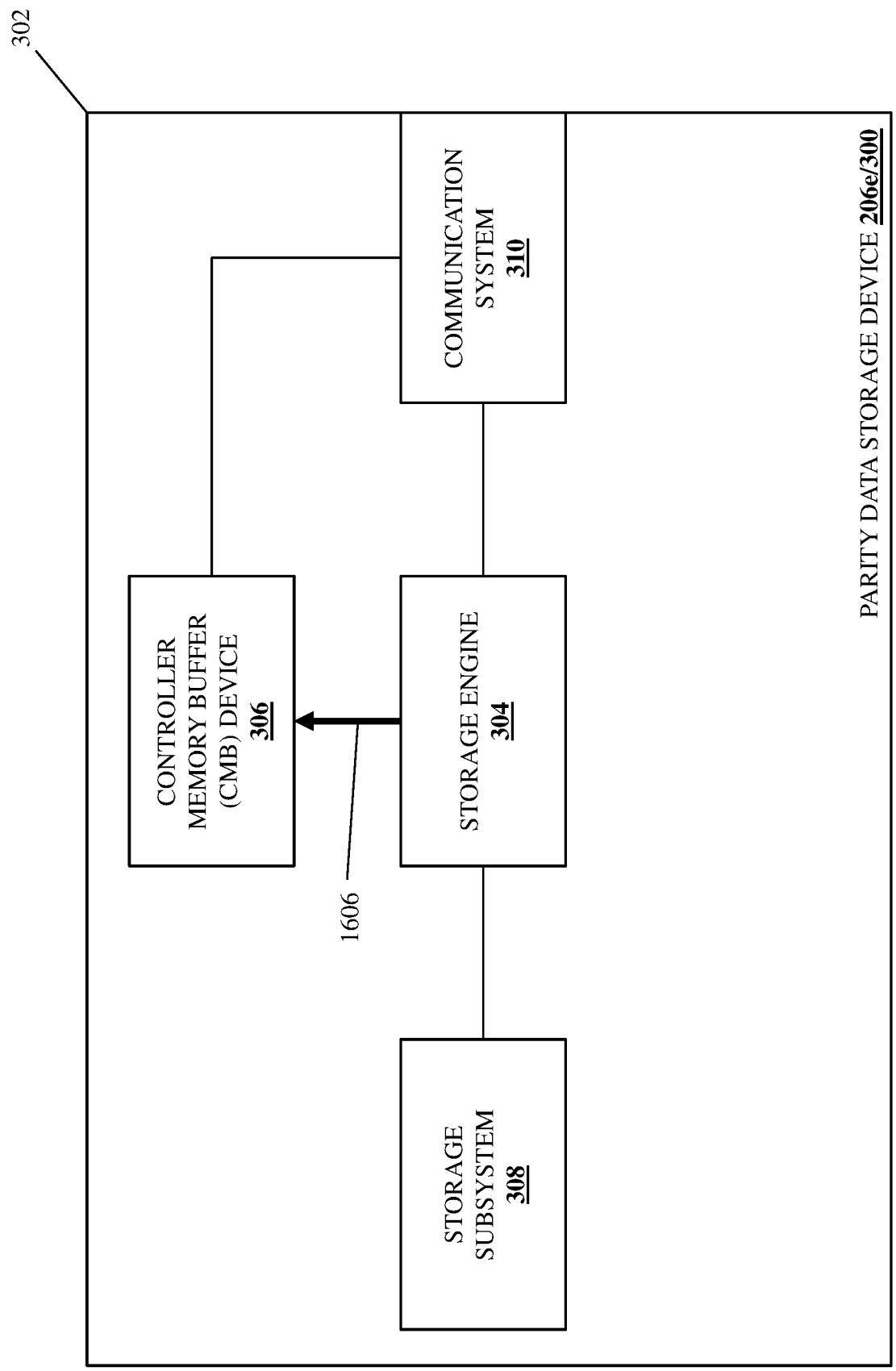
FIG. 16F is a schematic view illustrating an embodiment of the storage device of FIG. 3 operating during the method of FIG. 5.
Figure 16G:
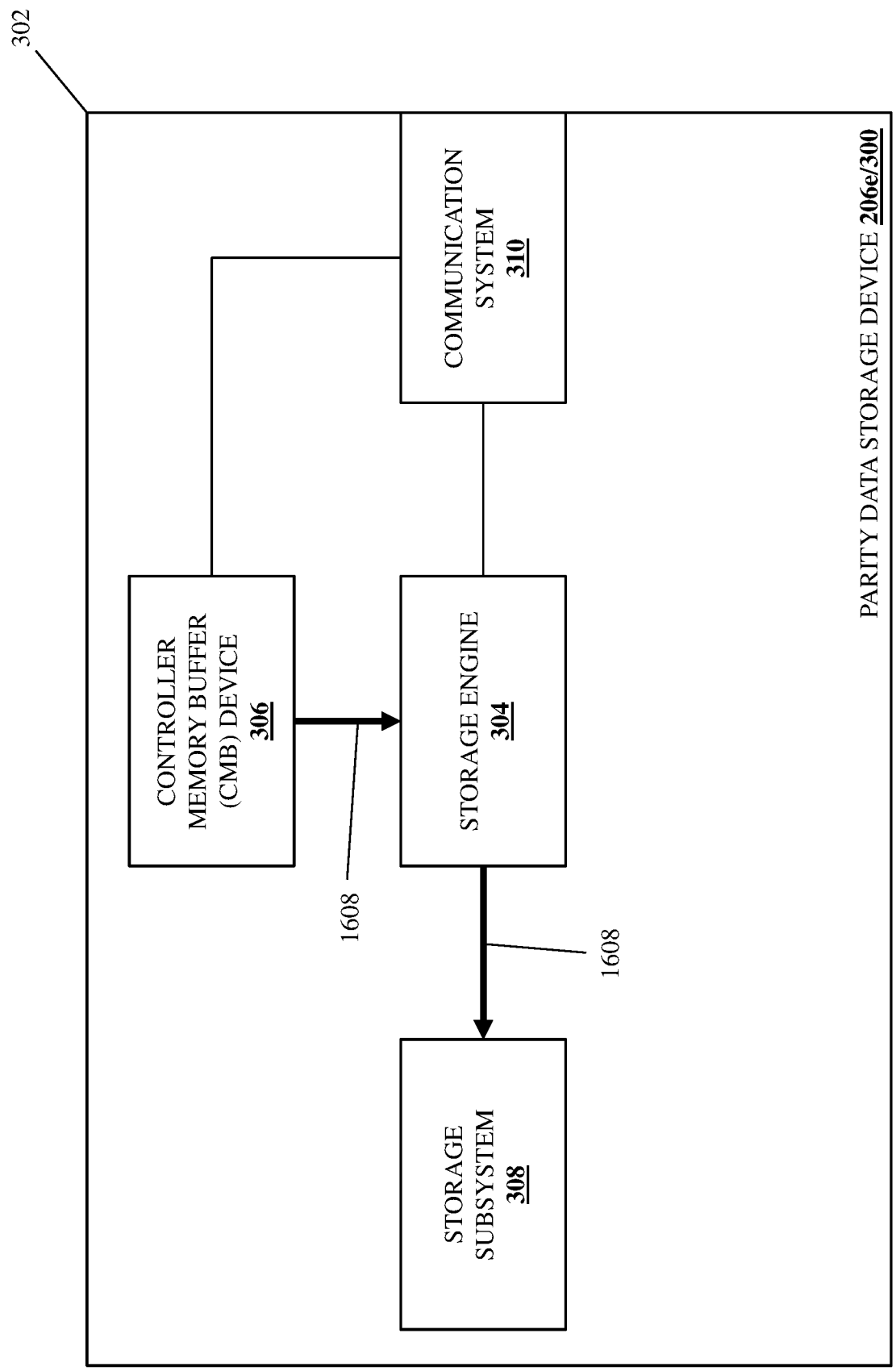
FIG. 16G is a schematic view illustrating an embodiment of the storage device of FIG. 3 operating during the method of FIG. 5.

With reference to FIG. 16F, the storage engine 304 in the parity data storage device 206*e*/300 may then perform final parity data storage operations 1606 that may include storing the final parity data in the CMB device 306 in the parity data storage device 206*e*/300. With reference to FIG. 16G, the storage engine 304 in the parity data storage device 206*e*/300 may then perform final parity data transfer operations 1608 that may include transferring the final parity data from the CMB device 306 in the parity data storage device 206*e*/300 to the storage subsystem 308 in the parity data storage device 206*e*/300.

Thus, systems and methods have been described that distribute the generation of parity data, when performing RMW operations with both full strip writes and partial strip writes, between a software RAID engine and storage device(s) that will store that parity data along with the primary data from which it was generated. This is accomplished by modifying the full strip write/partial strip write data reconstruction write operation embodiments described above such that the software RAID subsystem causes the parity data storage device to provide access to old parity data, and causes the parity data storage device to generate final parity data using the first intermediate parity data, the second intermediate parity data, and the old parity data. As such, the processing required by the software RAID engine to generate parity data when performing RMW operations with both full strip writes and partial strip writes is reduced, allowing its processing system to be utilized for other software RAID operations.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Redundant Array of Independent Disk (RAID) distributed parity generation system, comprising:
a chassis;
a plurality of storage devices that are included in the chassis; and
a Redundant Array of Independent Disk (RAID) subsystem that is included in the chassis and that is coupled to each of the plurality of storage devices, wherein the RAID subsystem is configured to:
receive a write instruction that is directed to a logical storage subsystem provided by the plurality of storage devices and that includes new primary data for writing to a subset of the plurality of storage devices;
generate, using the new primary data that will be written to the subset of the plurality of storage devices, first intermediate parity data that is configured for use in recovering any of the new primary data stored on the subset of the plurality of storage devices;
provide the first intermediate parity data in a parity data storage device that is included in the plurality of storage devices;
cause a first primary data storage device, which is not included in the subset of the plurality of storage devices to which the new primary data will be written, to use first existing primary data in the first primary data storage device and respective second existing primary data in each of at least one second primary data storage device, which is not included in the subset of the plurality of storage devices to which the new primary data will be written, to generate second intermediate parity data that is configured for use in recovering any of the first existing primary data stored on the first primary data storage device and the respective second existing primary data stored on each of the at least one second primary data storage device, and provide the second intermediate parity data in the first primary data storage device; and cause the parity data storage device to use the first intermediate parity data in the parity data storage device and the second intermediate parity data in the first primary data storage device to generate final parity data that is configured for use in recovering any of the new primary data stored on any of the subset of the plurality of storage devices, the first existing primary data stored on the first primary data storage device, and the respective second existing primary data stored on each of the at least one second primary data storage device.

2. The system of claim 1, wherein the RAID subsystem is configured to provide the first intermediate parity data in a Controller Memory Buffer (CMB) device in the parity data storage device, the first primary data storage device is configured to provide the second intermediate parity data in a CMB in the first primary data storage device, and the parity data storage device is configured to generate the final parity data using the first intermediate parity data in the CMB in the parity data storage device and the second intermediate parity data in the CMB in the first primary data storage device.

3. The system of claim 1, wherein the generating the first intermediate parity data, the second intermediate parity data, and the final parity data includes performing an XOR operation.

4. The system of claim 1, wherein the write instruction provides full strip writes of portions of the new primary data to each of the subset of the plurality of storage devices.

5. The system of claim 1, wherein the write instruction instructs a data reconstruction write operation of the new primary data to more than half of a stripe provided by the plurality of storage devices.

6. The system of claim 1, wherein the causing the first primary data storage device to generate the second intermediate parity data using the first existing primary data and the respective existing second primary data includes:

transmitting a first existing primary data copy instruction to the first primary data storage device that causes the first primary data storage device to copy the first existing primary data from its first storage subsystem to a first CMB in the first primary data storage device;

transmitting a respective second existing primary data copy instruction to each at least one second primary data storage device that causes each at least one second primary data storage device to copy the respective existing second primary data from its respective second storage subsystem to a respective second CMB in that second primary data storage device; and transmitting an second intermediate parity data XOR instruction to the first primary data storage device that causes the first primary data storage device to generate the second intermediate parity data using the first existing primary data and the respective second existing primary data.

7. An Information Handling System (IHS), comprising:
a processing system; and
a memory system that is coupled to the processing system and that includes instructions that, when executed by the processing system, cause the processing system to provide a Redundant Array of Independent Disk (RAID) engine that is configured to:

receive a write instruction that is directed to a logical storage subsystem provided by a plurality of storage devices and that includes new primary data for writing to a subset of the plurality of storage devices;

generate, using the new primary data that will be written to the subset of the plurality of storage devices, first intermediate parity data that is configured for use in recovering any of the new primary data stored on the subset of the plurality of storage devices;

provide the first intermediate parity data in a parity data storage device that is included in the plurality of storage devices;

cause a first primary data storage device, which is not included in the subset of the plurality of storage devices to which the new primary data will be written, to use first existing primary data in the first primary data storage device and respective second existing primary data in each of at least one second primary data storage device, which is not included in the subset of the plurality of storage devices to which the new primary data will be written, to generate second intermediate parity data that is configured for use in recovering any of the first existing primary data stored on the first primary data storage device and the respective second existing primary data stored on each of the at least one second primary data storage device, and provide the second intermediate parity data in the first primary data storage device; and cause the parity data storage device to use final parity data using the first intermediate parity data in the parity data storage device and the second intermediate parity data in the first primary data storage device to generate final parity data that is configured for use in recovering any of the new primary data stored on any of the subset of the plurality of storage devices, the first existing primary data stored on the first primary data storage device, and the respective second existing primary data stored on each of the at least one second primary data storage device.

8. The IHS of claim 7, wherein the RAID engine is configured to provide the first intermediate parity data in a Controller Memory Buffer (CMB) device in the parity data storage device, the first primary data storage device provides the second intermediate parity data in a CMB in the first primary data storage device, and the parity data storage device generates the final parity data using the first intermediate parity data in the CMB in the parity data storage device and the second intermediate parity data in the CMB in the first primary data storage device.

9. The IHS of claim 7, wherein the generating the first intermediate parity data, the second intermediate parity data, and the final parity data includes performing an XOR operation.

10. The IHS of claim 7, wherein the write instruction provides full strip writes of portions of the new primary data to each of the subset of the plurality of storage devices.

11. The IHS of claim 7, wherein the write instruction instructs a data reconstruction write operation of the new primary data to more than half of a stripe provided by the plurality of storage devices.

12. The IHS of claim 7, wherein the causing the first primary data storage device to generate the second intermediate parity data using the first existing primary data and the respective second existing primary data includes:

transmitting a first existing primary data copy instruction to the first primary data storage device that causes the first primary data storage device to copy the first existing primary data from its first storage subsystem to a first CMB in the first primary data storage device;

transmitting a respective second existing primary data copy instruction to each at least one second primary data storage device that causes each at least one second primary data storage device to copy the respective second existing primary data from its respective second storage subsystem to a respective second CMB in that second primary data storage device; and transmitting an second intermediate parity data XOR instruction to the first primary data storage device that causes the first primary data storage device to generate the second intermediate parity data using the first existing primary data and the respective second existing primary data.

13. The IHS of claim 12, wherein the first existing primary data copy instruction, the respective existing second primary data copy instructions, the second intermediate parity data XOR instruction, and a final parity data XOR instructions that causes the parity data storage device to generate the final parity data, are each provided in a respective vendor-specific command.

14. A method for distributing Redundant Array of Independent Disk (RAID) parity generation, comprising:

receiving, by a Redundant Array of Independent Disk (RAID) subsystem, a write instruction that is directed to a logical storage subsystem provided by a plurality of storage devices and that includes new primary data for writing to a subset of the plurality of storage devices;

generating, by the RAID subsystem using the new primary data that will be written to the subset of the plurality of storage devices, first intermediate parity data that is configured for use in recovering any of the new primary data stored on the subset of the plurality of storage devices;

providing, by the RAID subsystem, the first intermediate parity data in a parity data storage device that is included in the plurality of storage devices;

causing, by the RAID subsystem, a first primary data storage device, which is not included in the subset of the plurality of storage devices to which the new primary data will be written, to use first existing primary data in the first primary data storage device and respective second existing primary data in each of at least one second primary data storage device, which is not included in the subset of the plurality of storage devices to which the new primary data will be written, to generate second intermediate parity data that is configured for use in recovering any of the first existing primary data stored on the first primary data storage device and the respective second existing primary data stored on each of the at least one second primary data storage device, and provide the second intermediate parity data in the first primary data storage device; and causing, by the RAID subsystem, the parity data storage device to use the first intermediate parity data in the parity data storage device and the second intermediate parity data in the first primary data storage device to generate final parity data that is configured for use in recovering any of the new primary data stored on any of the subset of the plurality of storage devices, the first existing primary data stored on the first primary data storage device, and the respective second existing primary data stored on each of the at least one second primary data storage device.

15. The method of claim 14, wherein the RAID subsystem provides the first intermediate parity data in a Controller Memory Buffer (CMB) device in the parity data storage device, the first primary data storage device provides the second intermediate parity data in a CMB in the first primary data storage device, and the parity data storage device generate the final parity data using the first intermediate parity data in the CMB in the parity data storage device and the second intermediate parity data in the CMB in the first primary data storage device.

16. The method of claim 14, wherein the generating the first intermediate parity data, the second intermediate parity data, and the final parity data includes performing an XOR operation.

17. The method of claim 14, wherein the write instruction provides full strip writes of portions of the new primary data to each of the subset of the plurality of storage devices.

18. The method of claim 14, wherein the write instruction instructs a data reconstruction write operation of the new primary data to more than half of a stripe provided by the plurality of storage devices.

19. The method of claim 14, wherein the causing the first primary data storage device to generate the second intermediate parity data using the first existing primary data and the respective second existing primary data includes:

transmitting a first existing primary data copy instruction to the first primary data storage device that causes the first primary data storage device to copy the first existing primary data from its first storage subsystem to a first CMB in the first primary data storage device;

transmitting a respective second existing primary data copy instruction to each at least one second primary data storage device that causes each at least one second primary data storage device to copy the respective second existing primary data from its respective second storage subsystem to a respective second CMB in that second primary data storage device; and transmitting an second intermediate parity data XOR instruction to the first primary data storage device that causes the first primary data storage device to generate the second intermediate parity data using the first existing primary data and the respective existing second primary data.

20. The method of claim 19, wherein the first existing primary data copy instruction, the respective second existing primary data copy instructions, the second intermediate parity data XOR instruction, and a final parity data XOR instructions that causes the parity data storage device to generate the final parity data, are each provided in a respective vendor-specific command.

* * * * *